(12) United States Patent
Kimura et al.

(10) Patent No.: US 10,708,941 B2
(45) Date of Patent: Jul. 7, 2020

(54) APPARATUS FOR ACQUIRING AND REPORTING POWER ALLOCATION

(71) Applicant: SONY CORPORATION, Tokyo (JP)

(72) Inventors: Ryota Kimura, Tokyo (JP); Shinichiro Tsuda, Kanagawa (JP); Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/523,458

(22) PCT Filed: Sep. 2, 2015

(86) PCT No.: PCT/JP2015/074943
§ 371 (c)(1),
(2) Date: May 1, 2017

(87) PCT Pub. No.: WO2016/080051
PCT Pub. Date: May 26, 2016

(65) Prior Publication Data
US 2017/0339713 A1    Nov. 23, 2017

(30) Foreign Application Priority Data
Nov. 21, 2014   (JP) .................................. 2014-236428

(51) Int. Cl.
*H04W 72/12* (2009.01)
*H04W 52/34* (2009.01)
*H04L 5/00* (2006.01)
*H04W 24/10* (2009.01)

(52) U.S. Cl.
CPC ......... *H04W 72/1289* (2013.01); *H04L 5/003* (2013.01); *H04W 24/10* (2013.01); *H04W 52/346* (2013.01); *H04W 72/12* (2013.01); *H04L 5/0051* (2013.01); *Y02D 70/00* (2018.01)

(58) Field of Classification Search
None
See application file for complete search history.

(56) References Cited

U.S. PATENT DOCUMENTS

| | | | | |
|---|---|---|---|---|
| 9,572,197 | B1 * | 2/2017 | Wurtenberger | H04W 88/08 370/328 |
| 2006/0014544 | A1 * | 1/2006 | Tolli | H04W 36/22 455/453 |
| 2007/0250638 | A1 * | 10/2007 | Kiran | H04L 1/0006 709/236 |
| 2008/0080634 | A1 * | 4/2008 | Kotecha | H04B 7/0417 375/267 |

(Continued)

FOREIGN PATENT DOCUMENTS

| | | |
|---|---|---|
| JP | 2003-078419 A | 3/2003 |
| JP | 2003-229835 A | 8/2003 |

(Continued)

OTHER PUBLICATIONS

Li, et al., "Performance Evaluation of Non-Orthogonal Multiple Access Combined with Opportunistic Beamforming", IEEE, 2014, 05 pages.

*Primary Examiner* — Anh Vu H Ly
(74) *Attorney, Agent, or Firm* — Chip Law Group

(57) ABSTRACT

There is provided a device including: an acquisition unit configured to acquire information on power allocation to a data signal serving as a target for multiplexing using power allocation; and a reporting unit configured to report the information on the power allocation to a terminal device.

21 Claims, 32 Drawing Sheets

(56) References Cited

U.S. PATENT DOCUMENTS

| | | | | |
|---|---|---|---|---|
| 2012/0008532 A1* | 1/2012 | Miyoshi | H04L 1/1819 | 370/310 |
| 2012/0201282 A1* | 8/2012 | Li | H04B 7/0417 | 375/219 |
| 2014/0086160 A1 | 3/2014 | Kim et al. | | |
| 2015/0171983 A1* | 6/2015 | Kusashima | H04J 11/004 | 370/329 |
| 2016/0037460 A1* | 2/2016 | Benjebbour | H04L 1/0003 | 370/329 |
| 2017/0272139 A1* | 9/2017 | Benjebbour | H04L 5/00 | 370/329 |
| 2017/0303156 A1* | 10/2017 | Kimura | H04W 24/10 | 370/328 |
| 2017/0339645 A1* | 11/2017 | Jeong | H04W 52/243 | 370/329 |
| 2017/0374664 A1* | 12/2017 | Kimura | H04L 5/001 | 370/328 |
| 2018/0027544 A1* | 1/2018 | Kimura | H04J 11/00 | 370/330 |
| 2018/0054275 A1* | 2/2018 | Kimura | H03M 13/27 | 370/328 |
| 2018/0160403 A1* | 6/2018 | Matsuda | H04L 1/0071 | 370/328 |
| 2018/0219590 A1* | 8/2018 | Matsuda | H04B 7/0665 | 370/328 |
| 2018/0219708 A1* | 8/2018 | Kimura | H03M 13/25 | 370/328 |
| 2019/0013922 A1* | 1/2019 | Matsuda | H04L 5/0092 | 370/328 |
| 2019/0058616 A1* | 2/2019 | Matsuda | H04L 5/0053 | 370/328 |

FOREIGN PATENT DOCUMENTS

| | | |
|---|---|---|
| JP | 2013-247513 A | 12/2013 |
| WO | 2014/162819 A1 | 10/2014 |

* cited by examiner

FIG. 11

| INDEX | 0 | 1 | 2 | 3 | 4 | ... | N-3 | N-2 | N-1 |
|---|---|---|---|---|---|---|---|---|---|
| POWER (dBm) | $P_{DATA,L}$ | $P_{DATA,L}$ +0.5 | $P_{DATA,L}$ +1.0 | $P_{DATA,L}$ +1.5 | $P_{DATA,L}$ +2.0 | ... | $P_{DATA,H}$ -1.0 | $P_{DATA,H}$ -0.5 | $P_{DATA,H}$ |

FIG. 12

| INDEX | 0 | 1 | 2 | 3 | 4 | ... | N-3 | N-2 | N-1 |
|---|---|---|---|---|---|---|---|---|---|
| DIFFERENCE OF POWER (dBm) | 0 | 0.5 | 1.0 | 1.5 | 2.0 | ... | 0.5× (N-3) | 0.5× (N-2) | 0.5× (N-1) |

FIG. 13

| INDEX | 0 | 1 | 2 | 3 | 4 | ... | N-3 | N-2 | N-1 |
|---|---|---|---|---|---|---|---|---|---|
| POWER (dBm) | -0.5× (N-1) | -0.5× (N-2) | -0.5× (N-3) | -0.5× (N-4) | -0.5× (N-5) | ... | -1.0 | -0.5 | 0 |

FIG. 14

| INDEX | 0 | 1 | 2 | 3 | 4 | ... | N-3 | N-2 | N-1 |
|---|---|---|---|---|---|---|---|---|---|
| POWER (dBm) | $P_{UERS,L}$ | $P_{UERS,L}$ +0.5 | $P_{UERS,L}$ +1.0 | $P_{UERS,L}$ +1.5 | $P_{UERS,L}$ +2.0 | ... | $P_{UERS,H}$ -1.0 | $P_{UERS,H}$ -0.5 | $P_{UERS,H}$ |

FIG. 15

| INFORMATION ELEMENTS |
| --- |
| CARRIER INDICATOR |
| RESOURCE ALLOCATION HEADER |
| RESOURCE BLOCK ALLOCATION |
| TPC COMMAND FOR UPLINK |
| DOWNLINK ASSIGNMENT INDEX |
| HARQ PROCESS NUMBER |
| ANTENNA PORTS, SCRAMBLING PATTERN, INTERLEAVING PATTERN, AND LAYERS |
| SRS REQUEST |
| MODULATION AND CODING SCHEME(MCS) |
| NEW DATA INDICATOR |
| REDUNDANCY VERSION |
| SCH POWER |
| UERS POWER |
| SCH POWER OFFSET FROM UERS |
| SCH POWER OFFSET FROM CRS |
| UERS POWER OFFSET FROM SCH |
| UERS POWER OFFSET FROM CRS |
| SPC POWER RANK |

FIG. 16

| TRANSMISSION MODE | (TYPYCAL) TRANSMISSION SCHEME | ANTENNA PORT FOR DATA SIGNAL |
|---|---|---|
| 1 | SINGLE ANTENNA PORT | 0 |
| 2 | TRANSMIT DIVERSITY | 0, 1, 2, 3 |
| 3 | OPEN LOOP SPATIAL MULTIPLEXING OR TRANSMIT DIVERSITY | 0, 1, 2, 3 |
| 4 | CLOSERD LOOP SPATIAL MULTIPLEXING OR RANSMIT DIVERSITY | 0, 1, 2, 3, 4, 5, 7, 8 |
| 5 | MULTI-USER MIMO | 0, 1, 2, 3, 4, 5, 7, 8 |
| 6 | CLOSED LOOP SPATIAL MULTIPLEXING USING A SINGLE TRANSMISSION LAYER | 0, 1, 2, 3, 4, 5, 7, 8 |
| 7 | SINGLE ANTENNA PORT OR TRANSMIT DIVERSITY | 0, 1, 2, 3, 5 |
| 8 | DUAL LAYER TRANSMISSION | 0, 1, 2, 3, 7, 8 |
| 9 | UP TO 8 LAYER TRANSMISSION | 0, 1, 2, 3, 7, 8, 9, 10, 11, 12, 13, 14 |
| 10 | UP TO 8 LAYER TRANSMISSION | 0, 1, 2, 3, 7, 8, 9, 10, 11, 12, 13, 14 |

FIG. 17

| ANTENNA PORT INDEX | 0 to 3 | 4 | 5 | 6 | 7 to 8 | 9 to 14 | 15 to 22 |
|---|---|---|---|---|---|---|---|
| CRS | X | | | | | | |
| MBSFN RS | | X | | | | | |
| UERS | | | X | | X | X | |
| POSITIONING RS | | | | X | | | |
| CSI RS | | | | | | | X |

FIG. 18

| | FIRST ALLOCATION RELATED INFORMATION | | | |
|---|---|---|---|---|
| (1A) | (1B) | (1C) | (1D) | (1E) |
| X | X | — | X | — |

FIG. 19

| | FIRST ALLOCATION RELATED INFORMATION | | | | |
|---|---|---|---|---|---|
| | (1A) | (1B) | (1C) | (1D) | (1E) |
| (2A) | X | X | X | X | X |
| (2B) | X | X | X | X | X |
| (2C) | X | X | — | X | — |
| (2D) | X | X | X | X | X |
| (2E) | X | X | — | X | X |
| (2F) | X | X | — | X | X |

SECOND ALLOCATION RELATED INFORMATION

APPARATUS FOR ACQUIRING AND REPORTING POWER ALLOCATION

CROSS REFERENCE TO RELATED APPLICATIONS

This application is a U.S. National Phase of International Patent Application No. PCT/JP2015/074943 filed on Sep. 2, 2015, which claims priority benefit of Japanese Patent Application No. JP 2014-236428 filed in the Japan Patent Office on Nov. 21, 2014. Each of the above-referenced applications is hereby incorporated herein by reference in its entirety.

TECHNICAL FIELD

The present invention relates to an apparatus.

BACKGROUND ART

Non-orthogonal multiple access (NOMA) has been attracting attention as a radio access technology (RAT) for a fifth generation (5G) mobile communication system following Long Term Evolution (LTE)/LTE-Advanced (LTE-A). In orthogonal frequency-division multiple access (OFDMA) and single-carrier frequency-division multiple access (SC-FDMA), which are adopted in LTE, radio resources (e.g., resource blocks) are allocated to users without overlap. These schemes are called orthogonal multiple access. In contrast, in non-orthogonal multiple access, radio resources are allocated to users with overlap. In non-orthogonal multiple access, signals of users interfere with each other, but a signal for each user is taken out by a high-precision decoding process at the reception side. Non-orthogonal multiple access, in theory, achieves higher cell communication capability than orthogonal multiple access.

One of radio access technologies classified into non-orthogonal multiple access is superposition coding (SPC) multiplexing/multiple access. SPC is a scheme in which signals to which different levels of power are allocated are multiplexed on at least partly overlapping radio resources in frequency and time. At the reception side, interference cancellation and/or iterative detection is performed for reception/decoding of signals multiplexed on the same radio resource.

For example, PTLs 1 and 2 disclose, as SPC or a technology equivalent to SPC, techniques for setting an amplitude (or power) that allows appropriate demodulation/decoding. Moreover, for example, PTL 3 discloses a technique for enhancing successive interference cancellation (SIC) for reception of multiplexed signals.

CITATION LIST

Patent Literature

Patent Literature 1: JP 2003-78419A
Patent Literature 2: JP 2003-229835A
Patent Literature 3: JP 2013-247513A

DISCLOSURE OF INVENTION

Technical Problem

However, when data signals are multiplexed using power allocation (for example, using SPC), a reception device that receives the data signals is not capable of appropriately decoding the data if the device does not ascertain the reception power of the data included in a multiplexed signal.

Thus, it is desirable to provide a mechanism in which a data signal can be appropriately decoded when multiplexing is performed using power allocation.

Solution to Problem

According to the present disclosure, there is provided a device including: an acquisition unit configured to acquire information on power allocation to a data signal serving as a target for multiplexing using power allocation; and a reporting unit configured to report the information on the power allocation to a terminal device.

Further, according to the present disclosure, there is provided a device including: an acquisition unit configured to acquire information on power allocation to a data signal serving as a target for multiplexing using power allocation; and a reception processing unit configured to decode the data signal on the basis of the information on the power allocation.

Advantageous Effects of Invention

According to the present disclosure described above, it is possible to appropriately decode a data signal when multiplexing is performed using power allocation. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is an explanatory diagram for describing an example of a plurality of indices each indicating power.

FIG. 12 is an explanatory diagram for describing a first example of a plurality of indices each indicating a difference of power.

FIG. 13 is an explanatory diagram for describing a second example of a plurality of indices each indicating a difference of power.

FIG. 14 is an explanatory diagram for describing an example of a plurality of indices each indicating power.

FIG. 15 is an explanatory diagram for describing an example of information elements included in downlink control information.

FIG. 16 is an explanatory diagram for describing examples of relationships of transmission modes (TMs) and antenna ports.

FIG. 17 is an explanatory diagram for describing examples of relationships of antenna ports and reference signals.

FIG. 18 is an explanatory diagram for describing examples of forms of first allocation related information in a case in which a data signal for a terminal device and a CRS are transmitted using the same antenna port.

FIG. 19 is an explanatory diagram for describing examples of forms of first allocation related information and forms of second allocation related information in a case in which a data signal for a terminal device and a UERS are transmitted using the same antenna port.

MODE(S) FOR CARRYING OUT THE INVENTION

Figure 1:
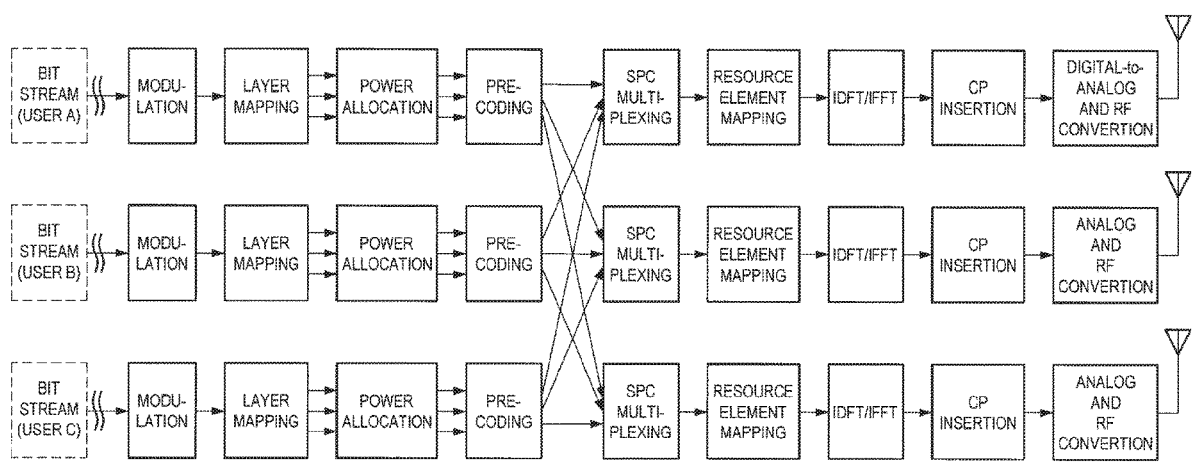
FIG. 1 is the first explanatory diagram for explaining an example of a process in a transmission device that supports SPC.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. SPC
2. Schematic configuration of system
3. Configuration of each device
3.1. Configuration of base station
3.2. Configuration of terminal device
4. First Embodiment
4.1. Technical features
4.2. Process flow
4.3. Modified example
5. Second Embodiment
5.1. Technical features
5.2. Process flow
6. Application example
6.1. Application example with regard to base station
6.2. Application example with regard to terminal device
7. Conclusion

1. SPC

Figure 2:
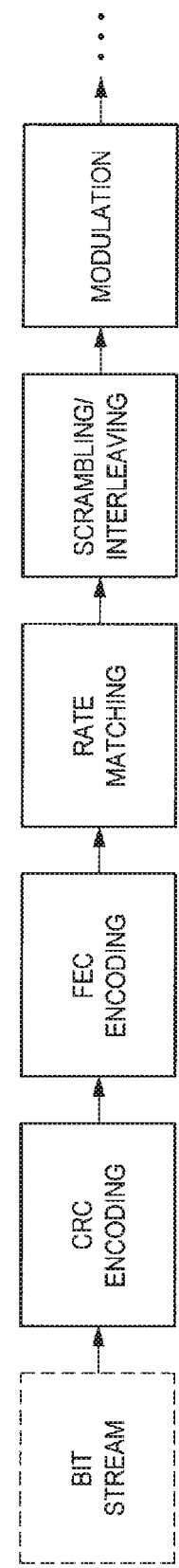
FIG. 2 is the second explanatory diagram for explaining an example of a process in a transmission device that supports SPC.
Figure 3:
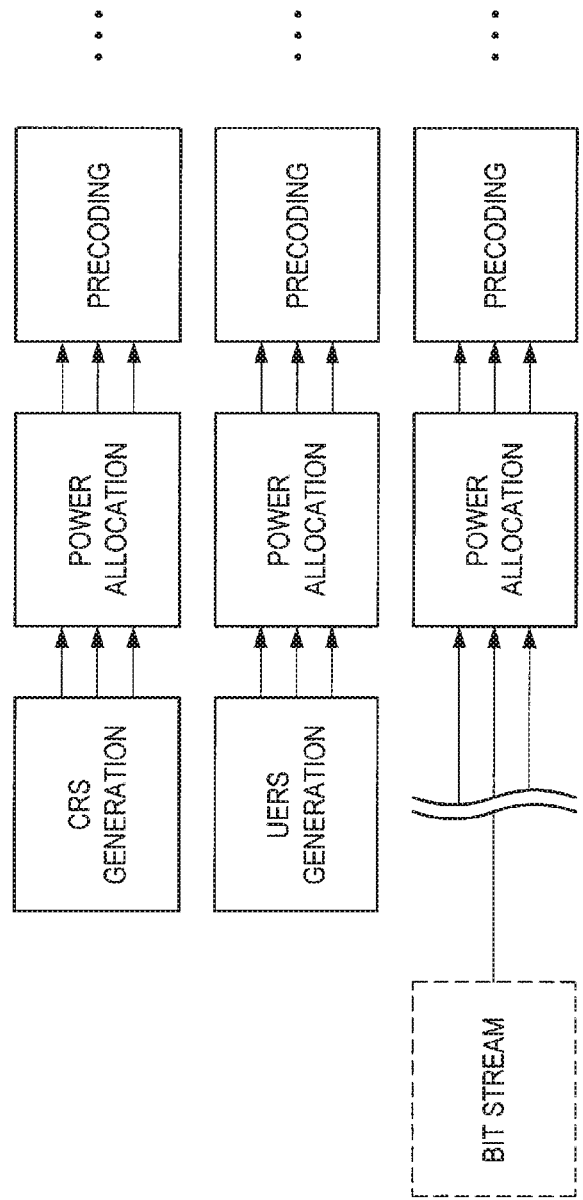
FIG. 3 is the third explanatory diagram for explaining an example of a process in a transmission device that supports SPC.

Firstly described with reference to FIGS. 1 to 4 are processes and signals of SPC.
(a) Process in Transmission Device FIGS. 1 to 3 are explanatory diagrams for explaining an example of a process in a transmission device that supports SPC. According to FIG. 1, for example, bit streams (e.g., transport blocks) of a user A, a user B, and a user C are processed. For each of these bit streams, some processes (e.g., cyclic redundancy check (CRC) encoding, forward error correction (FEC) encoding, rate matching, and scrambling/interleaving, as illustrated in FIG. 2) are performed and then modulation is performed. Further, layer mapping, power allocation, precoding, SPC multiplexing, resource element mapping, inverse discrete Fourier transform (IDFT)/inverse fast Fourier transform (IFFT), cyclic prefix (CP) insertion, digital-to-analog and radio frequency (RF) conversion, and the like are performed.

In particular, in power allocation, power is allocated to signals of the user A, the user B, and the user C, and in SPC multiplexing, the signals of the user A, the user B, and the user C are multiplexed.

Figure 4:
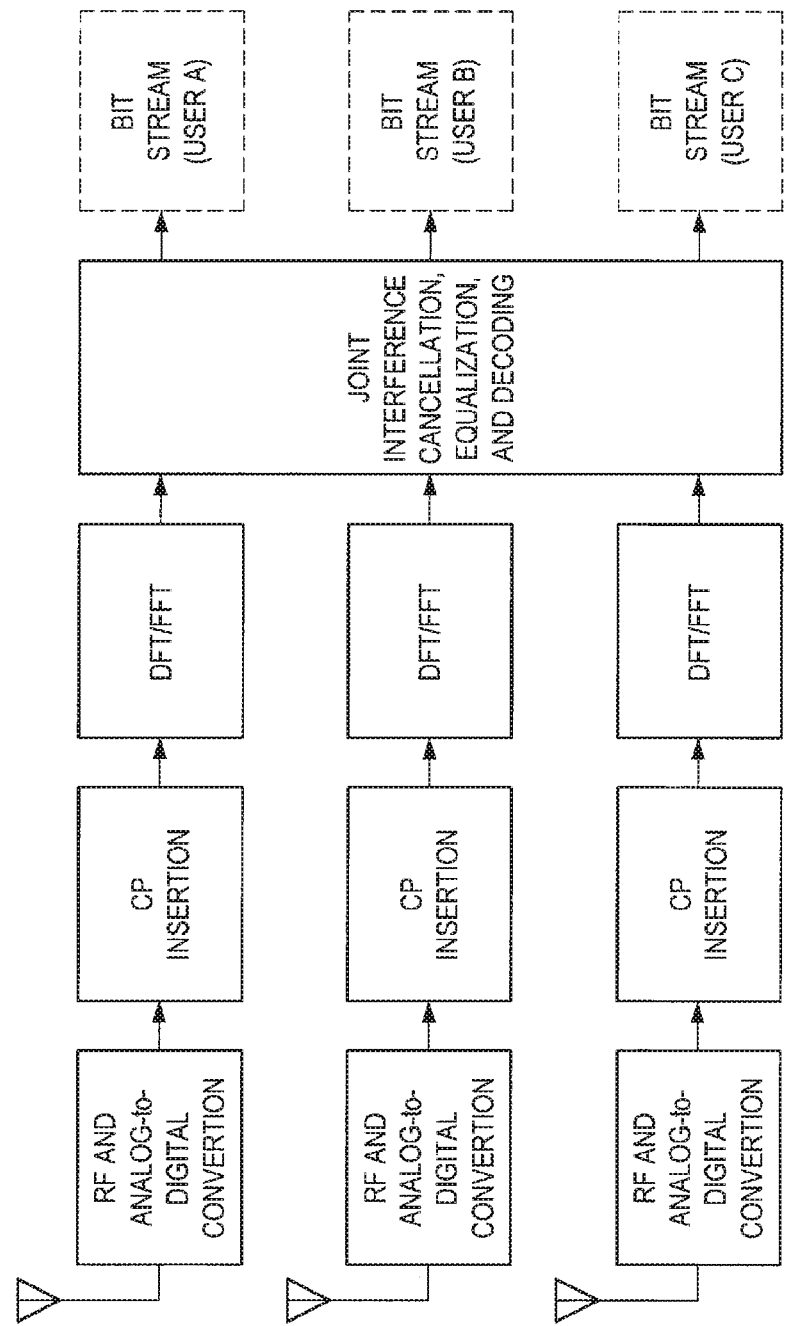
FIG. 4 is an explanatory diagram for explaining an example of a process in a reception device that performs interference cancellation.

Note that, as illustrated in FIG. 3, a cell-specific reference signal (CRS) and/or a UE-specific reference signal (UERS), for example, are transmitted in addition to the bit streams. In addition to power allocation to the bit streams, for example, power allocation to the CRS, and power allocation to the UERS are also performed. The CRS and the UERS are transmitted respectively using different antenna ports.
(b) Process in Reception Device FIG. 4 is an explanatory diagram for explaining an example of a process in a reception device that performs interference cancellation. According to FIG. 4, for example, RF and analog-to-digital conversion, CP removal, discrete Fourier transform (DFT)/fast Fourier transform (FFT), joint interference cancellation, equalization, decoding, and the like are performed. This provides bit streams (e.g., transport blocks) of the user A, the user B, and the user C.
(2) Transmission Signals and Reception Signals
(a) Downlink Next, downlink transmission signals and reception signals when SPC is adopted will be described. Assumed here is a multi-cell system of heterogeneous network (HetNet), small cell enhancement (SCE), or the like.

(a-1) Arbitrary Signal

An index of a cell to be in connection with a target user u is denoted by i, and the number of transmission antennas of a base station corresponding to the cell is denoted by $N_{TX,i}$. Each of the transmission antennas may also be called a transmission antenna port. A transmission signal from the cell i to the user u can be expressed in a vector form as below.

$$s_{i,u} = \begin{bmatrix} s_{i,u,0} \\ \vdots \\ s_{i,u,N_{TX,i}-1} \end{bmatrix} = W_{i,u} P_{i,u} x_{i,u} \quad [\text{Math. 1}]$$

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,i}-1,0} & \cdots & w_{i,u,N_{TX,i}-1,N_{SS,u}-1} \end{bmatrix} \quad [\text{Math. 2}]$$

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix} \quad [\text{Math. 3}]$$

$$x_{i,u} = \begin{bmatrix} x_{i,u,0} \\ \vdots \\ x_{i,u,N_{SS,u}-1} \end{bmatrix} \quad [\text{Math. 4}]$$

In the above expressions, $N_{SS,u}$ denotes the number of spatial transmission streams for the user u. Basically, $N_{SS,u}$ is a positive integer equal to or less than $N_{TX,i}$. A vector $x_{i,u}$ is a spatial stream signal to the user u. Elements of this vector basically correspond to digital modulation symbols of phase shift keying (PSK), quadrature amplitude modulation (QAM), or the like. A matrix $W_{i,u}$ is a precoding matrix for the user u. An element in this matrix is basically a complex number, but may be a real number.

A matrix $P_{i,u}$ is a power allocation coefficient matrix for the user u in the cell i. In this matrix, each element is preferably a positive real number. Note that this matrix may be a diagonal matrix (i.e., a matrix whose components excluding diagonal components are zero) as below.

$$P_{i,u} = \begin{bmatrix} P_{i,u,0,0} & 0 & \cdots & 0 \\ 0 & P_{i,u,1,1} & \ddots & \vdots \\ \vdots & \ddots & \ddots & 0 \\ 0 & \cdots & \cdots & P_{i,u,N_{SS,u}-1,N_{SS,u}-1} \end{bmatrix} \quad [\text{Math. 5}]$$

If adaptive power allocation for a spatial stream is not performed, a scalar value $P_{i,u}$ may be used instead of the matrix $P_{i,u}$.

As well as the user u, another user v is present in the cell i, and a signal $s_{i,v}$ of the other user v is also transmitted on the same radio resource. These signals are multiplexed by SPC. A signal $s_i$ from the cell i after multiplexing is expressed as below.

$$s_i = \sum_{u' \in U_i} s_{i,u'} \quad [\text{Math. 6}]$$

In the above expression, $U_i$ denotes a set of users for which multiplexing is performed in the cell i. Also in a cell j (a cell that serves as an interference source for the user u) other than a serving cell of the user u, a transmission signal $s_j$ is generated similarly. Such a signal is received as interference at the user side. A reception signal $r_u$ of the user u can be expressed as below.

$$r_u = \begin{bmatrix} r_{u,0} \\ \vdots \\ r_{u,N_{RX,u}-1} \end{bmatrix} = \sum_{i'} H_{u,i'} s_{i'} + n_u \quad [\text{Math. 7}]$$

$$H_{u,i} = \begin{bmatrix} h_{u,i,0,0} & \cdots & h_{u,i,0,N_{TX,i}-1} \\ \vdots & \ddots & \vdots \\ h_{u,i,N_{RX,u}-1,0} & \cdots & h_{u,i,N_{RX,u}-1,N_{TX,i}-1} \end{bmatrix} \quad [\text{Math. 8}]$$

$$n_u = \begin{bmatrix} n_{u,0} \\ \vdots \\ n_{u,N_{RX,u}-1} \end{bmatrix} \quad [\text{Math. 9}]$$

In the above expressions, a matrix $H_{u,i}$ is a channel response matrix for the cell i and the user u. Each element of the matrix $H_{u,i}$ is basically a complex number. A vector $n_u$ is noise included in the reception signal $r_u$ of the user u. For example, the noise includes thermal noise and interference from another system. The average power of the noise is expressed as below.

$$\sigma_{n,u}^2 \quad [\text{Math. 10}]$$

The reception signal $r_u$ can also be expressed by a desired signal and another signal as below.

$$r_u = H_{u,i} s_{i,u} + H_{u,i} \sum_{v \in U_i, v \neq u} s_{i,v} + \sum_{j \neq i} H_{u,j} \sum_{v \in U_j} s_{j,v} + n_u \quad [\text{Math. 11}]$$

In the above expression, the first term of the right side denotes a desired signal of the user u, the second term, interference in the serving cell i of the user u (called intra-cell interference, multi-user interference, multi-access interference, or the like), and the third term, interference from a cell other than the cell i (called inter-cell interference).

When orthogonal multiple access (e.g., OFDMA or SC-FDMA) or the like is adopted, the reception signal can be expressed as below.

$$r_u = H_{u,i} s_{i,u} + \sum_{j \neq i} H_{u,j} s_{j,v} + n_u \quad [\text{Math. 12}]$$

In orthogonal multiple access, no intra-cell interference occurs, and moreover, in the other cell j, a signal of the other user v is not multiplexed on the same radio resource.

(a-2) Regarding Data Signal, CRS, and UERS

As described with reference to FIG. 3, for example, power is allocated not only to a data signal generated from a bit stream but also to a CRS and a UERS.

As will be described below, power allocation may be performed individually on the data signal, the CRS, and the UERS, and multiplication of individual precoding matrixes may be performed.

$$S_{DATA,i,u} = W_{DATA,i,u} P_{DATA,i,u} x_{DATA,i,u}$$

$$S_{CRS,i} = W_{CRS,i} P_{CRS,i} x_{CRS,i}$$

$$S_{UERS,i,u} = W_{UERS,i,u} P_{UERS,i,u} x_{UERS,i,u} \quad \text{[Math. 13]}$$

As will be shown below, multiplication of the same precoding matrix may be performed on the data signal and the UERS, and multiplication of a precoding matrix may not be performed on the CRS.

$$S_{DATA,i,u} = W_{DATA,i,u} P_{DATA,i,u} x_{DATA,i,u}$$

$$S_{CRS,i} = P_{CRS,i} x_{CRS,i}$$

$$S_{UERS,i,u} = W_{DATA,i,u} P_{UERS,i,u} x_{UERS,i,u} \quad \text{[Math. 14]}$$

Furthermore, as will be shown below, the same power allocation may be performed on the data signal and the UERS (i.e., the same power may be allocated to the data signal and the UERS).

$$S_{DATA,i,u} = W_{DATA,i,u} P_{DATA,i,u} x_{DATA,i,u}$$

$$S_{CRS,i} = P_{CRS,i} x_{CRS,i}$$

$$S_{UERS,i,u} = W_{DATA,i,u} P_{DATA,i,u} x_{UERS,i,u} \quad \text{[Math. 15]}$$

Note that an average power of $x_{DATA,i,u}$, an average power of $x_{CRS,i}$, and an average power of $x_{UERS,i,u}$, are assumed to be the same.

(b) Uplink

Next, uplink transmission signals and reception signals when SPC is adopted will be described. Assumed here is a multi-cell system of HetNet, SCE, or the like. Note that the signs used for downlink will be further used as signs denoting signals and the like.

A transmission signal that the user u transmits in the cell i can be expressed in a vector form as below.

$$s_{i,u} = \begin{bmatrix} s_{i,u,0} \\ \vdots \\ s_{i,u,N_{TX,u}-1} \end{bmatrix} = W_{i,u} P_{i,u} x_{i,u} \quad \text{[Math. 16]}$$

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,u}-1,0} & \cdots & w_{i,u,N_{TX,u}-1,N_{SS,u}-1} \end{bmatrix} \quad \text{[Math. 17]}$$

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix} \quad \text{[Math. 18]}$$

$$x_{i,u} = \begin{bmatrix} x_{i,u,0} \\ \vdots \\ x_{i,u,N_{SS,u}-1} \end{bmatrix} \quad \text{[Math. 19]}$$

In the above expressions, the number of transmission antennas is the number of transmission antennas of the user, $N_{TX,u}$. As in downlink, a matrix $P_{i,u}$, which is a power allocation coefficient matrix for the user u in the cell i, may be a diagonal matrix.

In uplink, there is no case where a signal of a user and a signal of another user are multiplexed in the user; thus, a reception signal of a base station of the cell i can be expressed as below.

$$r_i = \begin{bmatrix} r_{i,0} \\ \vdots \\ r_{i,N_{RX,i}-1} \end{bmatrix} = \sum_{i'} \sum_{u' \in U_{i'}} H_{i',u',u} s_{i',u'} + n_i \quad \text{[Math. 20]}$$

$$H_{i,u} = \begin{bmatrix} h_{i,u,0,0} & \cdots & h_{i,u,0,N_{TX,u}-1} \\ \vdots & \ddots & \vdots \\ h_{i,u,N_{RX,i}-1,0} & \cdots & h_{i,u,N_{RX,i}-1,N_{TX,u}-1} \end{bmatrix} \quad \text{[Math. 21]}$$

$$n_i = \begin{bmatrix} n_{i,0} \\ \vdots \\ n_{i,N_{RX,i}-1} \end{bmatrix} \quad \text{[Math. 22]}$$

It should be noted that in uplink, unlike in downlink, a base station needs to obtain all signals from a plurality of users in a cell by decoding. Note also that a channel response matrix differs depending on a user.

When a focus is put on a signal transmitted by the user u, among uplink signals in the cell i, a reception signal can be expressed as below.

$$r_{i,u} = \begin{bmatrix} r_{i,u,0} \\ \vdots \\ r_{i,u,N_{RX,i}-1} \end{bmatrix} = \quad \text{[Math. 23]}$$

$$H_{i,u} s_{i,u} + \sum_{v \in U_i, v \neq u} H_{i,v} s_{i,v} + \sum_{j \neq i} \sum_{v \in U_j} H_{i,v} s_{j,v} + n_i$$

In the above expression, the first term of the right side denotes a desired signal of the user u, the second term, interference in the serving cell i of the user u (called intra-cell interference, multi-user interference, multi-access interference, or the like), and the third term, interference from a cell other than the cell i (called inter-cell interference).

When orthogonal multiple access (e.g., OFDMA or SC-FDMA) or the like is adopted, the reception signal can be expressed as below.

$$r_{i,u} = H_{i,u} s_{i,u} + \sum_{j \neq i} H_{i,v} s_{j,v} + n_i \quad \text{[Math. 24]}$$

In orthogonal multiple access, no intra-cell interference occurs, and moreover, in the other cell j, a signal of the other user v is not multiplexed on the same radio resource.

2. SCHEMATIC CONFIGURATION OF SYSTEM

Figure 5:
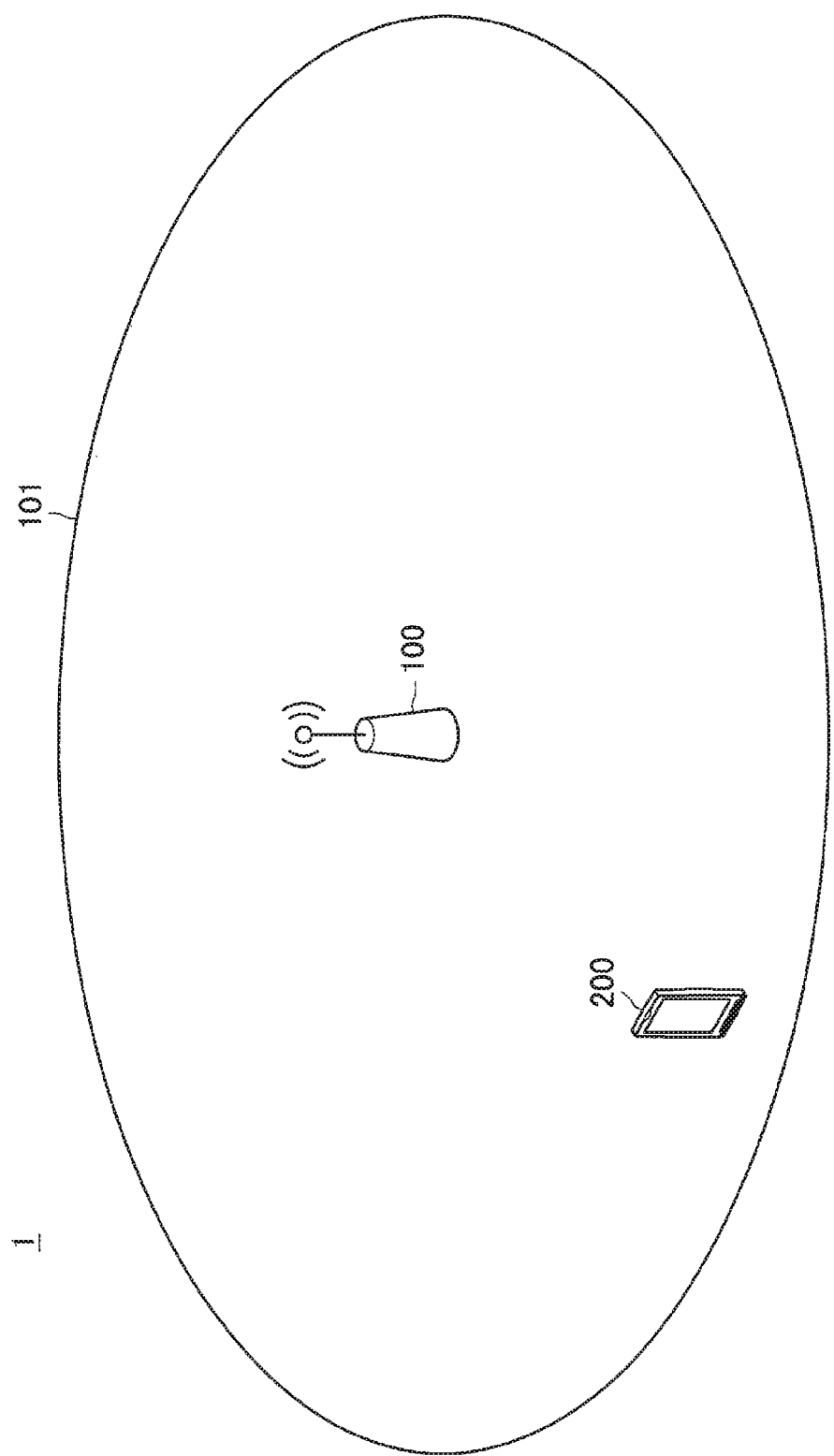
FIG. 5 is an explanatory diagram illustrating an example of the schematic configuration of a system according to an embodiment of the present disclosure.

Now, a schematic configuration of a system 1 according to an embodiment of the present disclosure will be described with reference to FIGS. 5 to 8. FIG. 5 is an explanatory diagram illustrating an example of the schematic configuration of the system 1 according to an embodiment of the present disclosure. According to FIG. 5, the system 1 includes a base station 100 and a terminal device 200. Here, the terminal device 200 is also called a user. The user may also be called a user equipment (UE). Here, the UE may be a UE defined in LTE or LTE-A, or may generally refer to communication equipment.

Note that, although only one terminal device 200 is illustrated here in order to further facilitate understanding, the system 1 can of course include a plurality of terminal devices 200. In addition, the system 1 can also include other types of terminal devices in addition to the terminal device 200. "Another terminal device" may be another terminal device 200 or a terminal device of another type.

(1) Base Station 100

The base station 100 is a base station of a cellular system (or mobile communication system). The base station 100 performs radio communication with a terminal device (e.g., the terminal device 200) located in a cell 101 of the base station 100. For example, the base station 100 transmits a downlink signal to the terminal device, and receives an uplink signal from the terminal device.

(2) Terminal Device 200

The terminal device 200 can perform communication in a cellular system (or mobile communication system). The terminal device 200 performs radio communication with a base station (e.g., the base station 100) of the cellular system. For example, the terminal device 200 receives a downlink signal from the base station, and transmits an uplink signal to the base station.

(3) Multiplexing/Multiple Access

In particular, in the embodiment of the present disclosure, the base station 100 performs radio communication with a plurality of terminal devices by non-orthogonal multiple access. For example, the base station 100 performs radio communication with the plurality of terminal devices by multiplexing/multiple access using SPC.

For example, the base station 100 performs radio communication with the plurality of terminal devices by multiplexing/multiple access using SPC in downlink. Specifically, for example, the base station 100 multiplexes data signals to the plurality of terminal devices using SPC. In this case, for example, the terminal device 200 removes one or more other data signals, as interference, from a multiplexed signal including a data signal to the terminal device 200, and decodes the resulting signal into the data signal to the terminal device 200.

Note that the base station 100 may perform radio communication with the plurality of terminal devices by multiplexing/multiple access using SPC in uplink, instead of or together with downlink. In this case, the base station 100 may decode a multiplexed signal including data signals transmitted from the plurality of terminal devices into the data signals.

(4) Transmission of Reference Signal

The base station 100 transmits a reference signal.

(a) Examples of Reference Signals (a-1) CRS+UERS

The base station 100 transmits, for example, a reference signal unique to a cell (cell-specific reference signal or CRS) and a reference signal unique to a user (a user-specific reference signal). The reference signal unique to a user is, for example, a UE-specific reference signal (UERS). The UERS may be a UERS defined in LTE or LTE-A, or may be called a demodulation reference signal (DMRS).

Figure 6:
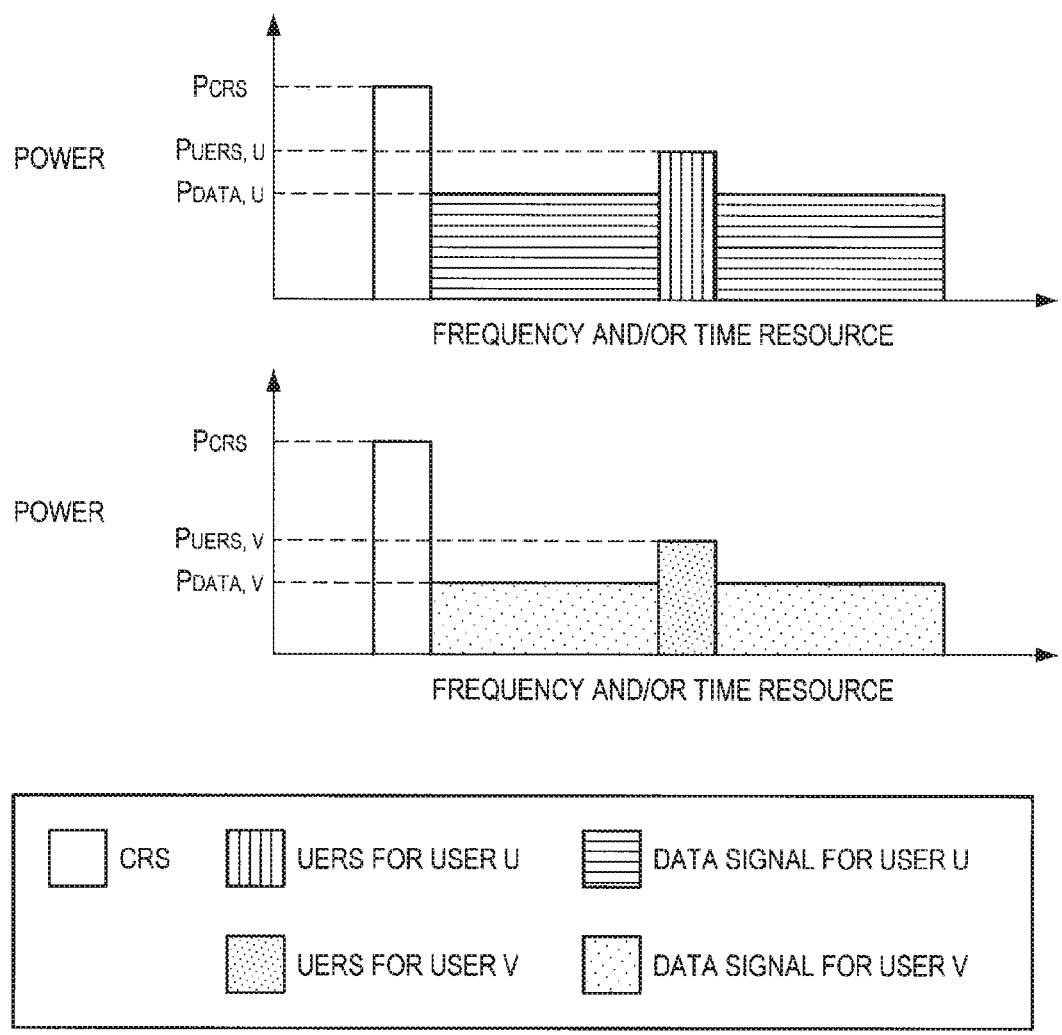
FIG. 6 is an explanatory diagram for describing a first example of transmission of reference signals and data signals.

FIG. 6 is an explanatory diagram for describing a first example of transmission of a reference signal and a data signal. Referring to FIG. 6, power of signals for a user U within a cell i is shown in the upper part, and power of signals for a user V within the cell i is shown in the lower part. Specifically, power of CRSs, UERSs, and data signals is shown. The horizontal axis represents frequency and/or time resources, and the vertical axis represents power or power density per unit resource. Although the CRS is described for both the user U and the user V, the signal is shared within the cell. For example, power of the CRS is denoted by $P_{CRS}$, power of the UERS for the user U is denoted by $P_{UERS,U}$, and power of the data signal for the user U is denoted by $P_{DATA,U}$. For example, power of the UERS for the user V is $P_{UERS,V}$, and power of the data signal for the user V is $P_{DATA,V}$. In this example, radio resources (frequency and/or time resources) to be used in transmission of the data signals are different from radio resources (frequency and/or time resources) to be used in transmission of the CRSs and UERSs. In addition, radio resources (frequency and/or time resources) to be used in transmission of the CRSs are different from radio resources (frequency and/or time resources) to be used in transmission of the UERSs. In this example, the data signals for the different users (the user U and the user V) are multiplexed using SPC. That is, the same radio resources are used in transmission of the data signals to the different users. Different levels of power are allocated to the data signals serving as a target for multiplexing. Furthermore, in this example, UERSs for the different users (the user U and the user V) are multiplexed (for example, using SPC). That is, the same radio resources are used in transmission of the UERSs to the different users. Different levels of power are allocated to the UERSs serving as a target for multiplexing.

Figure 7:
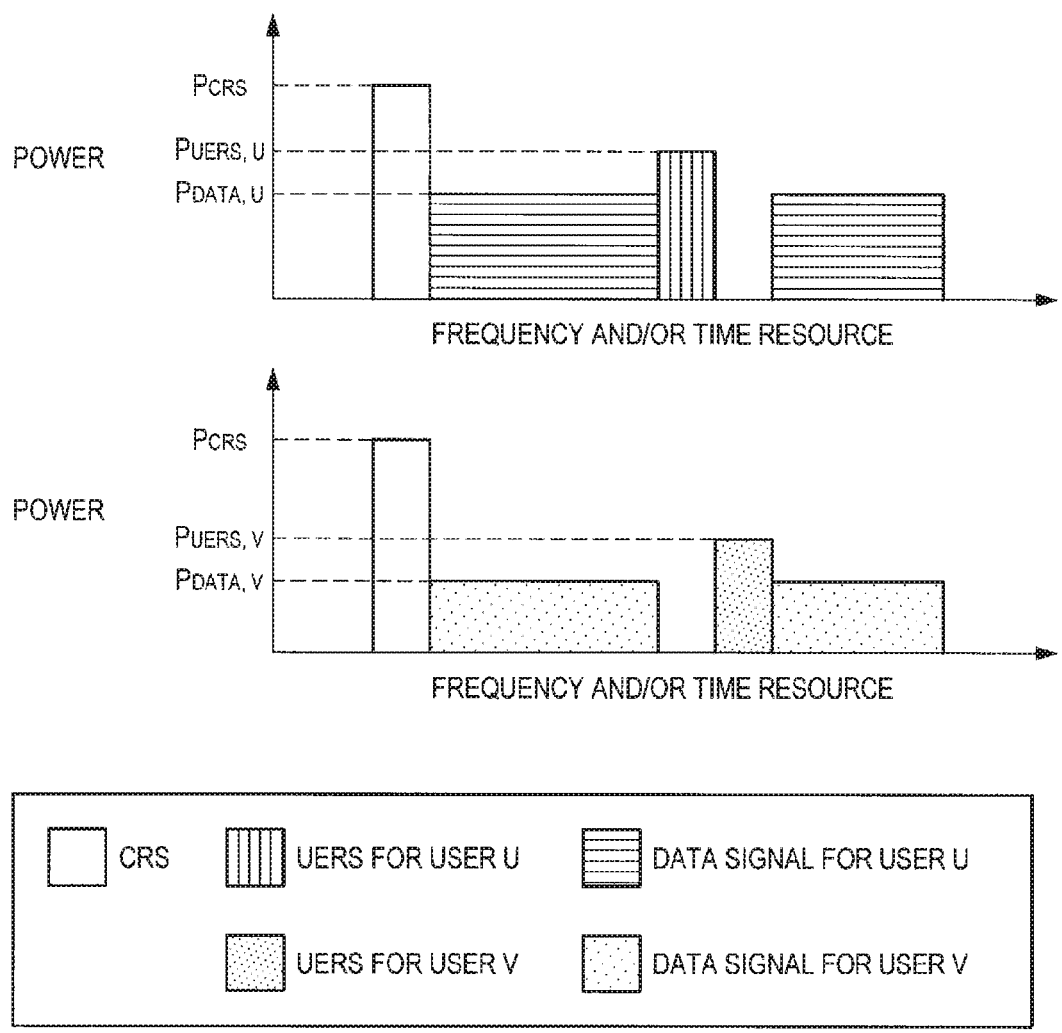
FIG. 7 is an explanatory diagram for describing a second example of transmission of reference signals and data signals.

FIG. 7 is an explanatory diagram for describing a second example of transmission of reference signals and data signals. Referring to FIG. 7, radio resources to be used in transmission of a UERS to a user are not used in transmission of another signal in this example. For example, radio resources to be used in transmission of the UERS to the user U are not used in transmission of the CRS, the data signal to the user U, the data signal to the user V, and the UERS to the user V. Radio resources to be used in transmission of the UERS to the user V, for example, are not used in transmission of the CRS, the data signal to the user V, the data signal to the user U, and the transmission of the UERS to the user U. Accordingly, for example, it is possible to enhance accuracy in channel estimation based on the UERS. However, radio resource use efficiency may be degraded.

Figure 8:
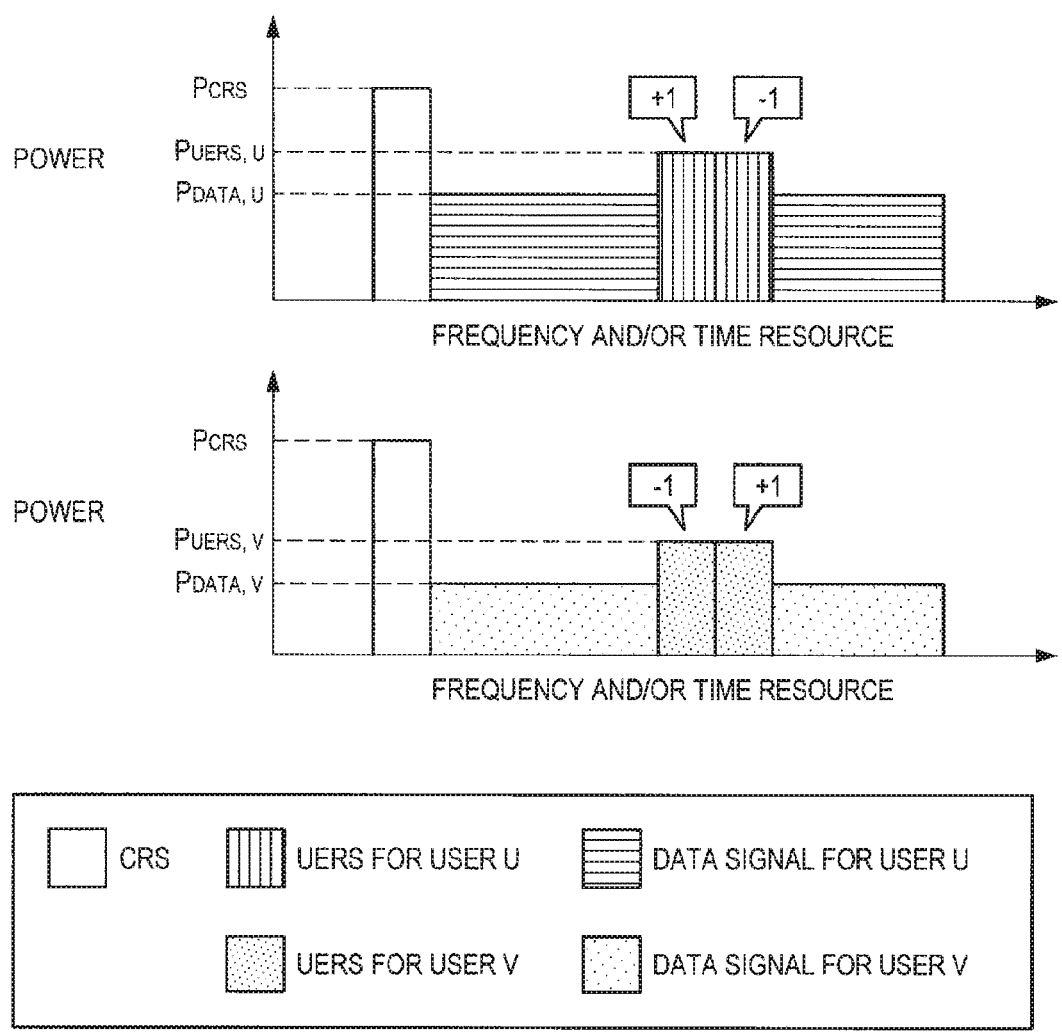
FIG. 8 is an explanatory diagram for describing a third example of transmission of reference signals and data signals.

FIG. 8 is an explanatory diagram for describing a third example of transmission of reference signals and data signals. Referring to FIG. 8, although the same radio resources are used in transmission of UERSs to different users in this example, orthogonality between the UERSs is heightened due to adjustment of a phase pattern. For example, as a phase of the UERS for the user U becomes different from a phase of the UERS for the user V, by adjusting the phase of the UERS for the user U and the phase of the UERS for the user V, orthogonality between the UERS for the user U and the UERS for the user V can be heightened. Accordingly, for example, it is possible to enhance accuracy in channel estimation based on the UERSs.

(a-2) CRS Only

The base station 100 may transmit a CRS, but may not transmit a UERS. In this case, radio resources to be used in transmission of the UERS in FIGS. 6 to 8 may be used in transmission of a data signal, rather than transmission of the UERS.

(a-3) UERS Only

The base station 100 may transmit a UERS, but may not transmit a CRS. In this case, radio resources to be used in transmission of the CRS in FIGS. 6 to 8 may be used in transmission of a data signal, rather than transmission of the CRS.

As an example, the base station 100 may transmit a UERS, but may not transmit a CRS on a secondary component carrier (SCC) of carrier aggregation. The SCC may be a component carrier (CC) that is used in transmission of a user plane but not used in transmission of a control plane.

As another example, the base station 100 may transmit a UERS, but may not transmit a CRS in a period for transmission of a user plane. Note that the base station 100 may transmit a CRS in a period for transmission of a control plane.

(b) Power Allocation

When a plurality of data signals are multiplexed using SPC, power is allocated to each of a plurality of data signals. A decision on power to be allocated to each of the plurality of data signals is performed by, for example, the base station 100. Note that, instead of the base station 100, the decision on power to be allocated to each of the plurality of data signals may be performed by another network node.

Referring to FIG. 6 again, for example, the power $P_{DATA,U}$ of the data signal for the user U and the power $P_{DATA,V}$ of the data signal for the user V have the following relationships.

$$P_{DATA,U} > P_{DATA,V}$$

$$P_{DATA,U} - P_{DATA,V} = \varepsilon_{U,V} \quad \text{[Math. 25]}$$

The above-described formulas are expressed in decibel forms. Note that it is desirable that path loss between the base station 100 (a base station of the cell i) and the user U is equal to or greater than path loss between the base station 100 (a base station of the cell i) and the user V.

When power is allocated to the data signals as described above, for example, it is desirable that the power $P_{UERS,U}$ of the UERS for the user U and the power $P_{UERS,V}$ of the UERS for the user V have the following relationships.

$$P_{UERS,U} > P_{UERS,V}$$

$$P_{UERS,U} - P_{UERS,V} = \varepsilon_{U,V} \quad \text{[Math. 26]}$$

That is, it is desirable that the difference (or ratio) between the power of the data signal for the user U and the data signal for the user V be equal to the difference (or ratio) between the power of the UERS for the user U and the UERS for the user V.

3. CONFIGURATION OF EACH DEVICE

Now, configurations of the base station 100 and the terminal device 200 according to an embodiment of the present disclosure will be described with reference to FIGS. 9 and 10.

3.1. Configuration of Base Station

First, an example of the configuration of the base station 100 according to an embodiment of the present disclosure will be described with reference to FIG. 9. FIG. 9 is a block diagram illustrating the example of the configuration of the base station 100 according to an embodiment of the present disclosure. According to FIG. 9, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes a power decision unit 151, an information acquisition unit 153, a reporting unit 155, a transmission processing unit 157 and a reception processing unit 159. Note that the processing unit 150 may further include a structural element other than these structural elements. That is, the processing unit 150 may perform operation other than the operation of these structural elements.

Operations of the power decision unit 151, the information acquisition unit 153, the reporting unit 155, the transmission processing unit 157, and the reception processing unit 159 will be described in detail below.

3.2. Configuration of Terminal Device

First, an example of the configuration of the terminal device 200 according to an embodiment of the present disclosure will be described with reference to FIG. 10. FIG. 10 is a block diagram illustrating the example of the configuration of the terminal device 200 according to an embodiment of the present disclosure. According to FIG. 10, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. The processing unit 240 includes an information acquisition unit 241, a transmission processing unit 243 and a reception processing unit 245. Note that the processing unit 240 may further include a structural element other than these structural elements. That is, the processing unit 240 may perform operation other than the operation of these structural elements.

Operations of the information acquisition unit 241, the transmission processing unit 243, and the reception processing unit 245 will be described below in detail.

4. FIRST EMBODIMENT

Next, a first embodiment of the present disclosure will be described with reference to FIGS. 11 to 26.

4.1. Technical Feature

First, technical features of the first embodiment will be described with reference to FIGS. 11 to 19.

(1) Reporting of Information on Power Allocation to Data Signal

The base station 100 (the information acquisition unit 153) acquires information on power allocation to a data signal serving as a target for multiplexing using SPC (hereinbelow, will be referred to as "first allocation related information"). In addition, the base station 100 (the reporting unit 155) reports the first allocation related information to the terminal device 200.

Accordingly, for example, when multiplexing is performed using SPC, the terminal device 200 can ascertain reception power of the data signal included in a multiplexed signal. Thus, the terminal device 200 can appropriately decode the data signal.

(a) Data Signal

The data signal is a signal to, for example, the terminal device 200. More specifically, the data signal is, for example, a downlink data signal transmitted from the base station 100 to the terminal device 200.

The data signal is, for example, a signal of a user plane. Note that the data signal may be a signal of signaling of a control plane (for example, radio resource control (RRC) signaling, or non-access stratum (NAS) signaling).

The data signal and data signals for one or more other terminal devices are multiplexed using SPC, for example, and a multiplexed signal is transmitted.

(b) First Allocation Related Information (b-1) Power Allocated to Data Signal

The first allocation related information is information indicating, for example, power allocated to the data signal. As an example, the power is power per unit resource (i.e., a power density).

Specifically, for example, the first allocation related information is an index indicating the power allocated to the data signal. For example, a plurality of indices each indicating power are prepared, and power indicated by one index among the plurality of indices is allocated to the data signal. Then, the first allocation related information is the one index, and the base station 100 reports the one index to the terminal device 200. Due to the reporting of the index, for example, an amount of information necessary for reporting is reduced, and overhead is reduced. Hereinbelow, an example of a plurality of indices each indicating power will be described with reference to FIG. 11.

FIG. 11 is an explanatory diagram for describing an example of a plurality of indices each indicating power. Referring to FIG. 11, N indices each indicating power are shown. An index 0, for example, indicates $P_{DATA,L}$ (dBm) which is lower limit power, an index 1 indicates $P_{DATA,L}+0.5$ (dBm), and an index 2 indicates $P_{DATA,L}+1.0$ (dBm). An index N−1, for example, indicates $P_{DATA,H}$ (dBm) which is upper limit power, an index N−2 indicates $P_{DATA,H}-0.5$ (dBm), and an index N−3 indicates $P_{DATA,H}-1.0$ (dBm). In this manner, indices indicating power are prepared at increments of 0.5 dBm between $P_{DATA,L}$ and $P_{DATA,H}$, and the first allocation related information indicates one of the indices 0 to N−1.

The plurality of indices and power indicated by each of the plurality of indices are held in, for example, the terminal device 200. Accordingly, for example, the terminal device 200 can ascertain power from an index reported by the base station 100 to the terminal device 200.

Note that the first allocation related information may be a value of power allocated to the data signal, instead of such an index. Accordingly, for example, power can be allocated to the data signal more freely.

(b-2) Difference Between Power Allocated to Data Signal and Power Allocated to Another Signal The first allocation related information may be information indicating a difference or a ratio between power allocated to the data signal and power allocated to another signal. The difference may be a difference in a decibel form, and the ratio may be a ratio in a linear form.

Another Signal

The other signal may be a signal transmitted using the same antenna port as the data signal.

Alternatively, the other signal may be a signal transmitted using the same one or more physical antenna elements as the data signal.

Reference Signal

The other signal may be a reference signal.

CRS

As a first example, the reference signal may be a cell-specific reference signal (CRS). In this case, the first allocation related information may indicate the difference between power $P_{DATA,U}$ allocated to a data signal for the terminal device 200 (user U) and power $P_{CRS}$ allocated to the CRS.

$$\varepsilon_{CRS,U} = P_{CRS} - P_{DATA,U} \qquad \text{[Math. 27]}$$

Of course, the first allocation related information can indicate the difference as follows.

$$\varepsilon_{CRS,U} = P_{DATA,U} - P_{CRS} \qquad \text{[Math. 28]}$$

UERS

As a second example, the reference signal may be a user-specific reference signal. The user-specific reference signal may be a UERS.

UERS for Terminal Device 200

The user-specific reference signal may be a reference signal unique to the terminal device 200 (in other words, a reference signal unique to a user of the terminal device 200). In this case, the first allocation related information may indicate the difference between power $P_{DATA,U}$ allocated to a data signal for the terminal device 200 (user U) and power $P_{UERS,U}$ allocated to the user-specific reference signal (UERS) for the terminal device 200 as follows.

$$\varepsilon_{UERS,U} = P_{UERS,U} - P_{DATA,U} \qquad \text{[Math. 29]}$$

Of course, the first allocation related information can indicate the difference as follows.

$$\varepsilon_{UERS,U} = P_{DATA,U} - P_{UERS,U} \qquad \text{[Math. 30]}$$

UERS for Other Terminal Device

The user-specific reference signal may be a reference signal unique to another terminal device (in other words, a reference signal unique to a user of the other terminal device). In this case, the first allocation related information may indicate the difference between power $P_{DATA,U}$ allocated to a data signal for the terminal device 200 (user U) and power $P_{UERS,V}$ allocated to a user-specific reference signal (UERS) for the other terminal device (user V) as follows.

$$\varepsilon_{UERS,U,V} = P_{UERS,V} - P_{DATA,U} \qquad \text{[Math. 31]}$$

Of course, the first allocation related information can indicate the difference as follows.

$$\varepsilon_{UERS,U,V} = P_{DATA,U} - P_{UERS,V} \quad \text{[Math. 32]}$$

Note that the power $P_{DATA,U}$ allocated to the data signal for the terminal device 200 (user U) and the power $P_{UERS,V}$ allocated to the user-specific reference signal (UERS) for the other terminal device (user V) may have one of the following two relationships.

$$P_{UERS,V} - P_{DATA,U} \geq 0 \quad \text{[Math. 33]}$$

$$P_{UERS,V} - P_{DATA,U} \leq 0 \quad \text{[Math. 34]}$$

Thus, each of the differences has only a positive value or only a negative value.

Others

Note that the reference signal may be a reference signal of another type (for example, a multimedia broadcast multicast service (MBMS) over single frequency network (MBSFN) RS, a channel state information (CSI) RS, or the like).

Another Data Signal

The other signal may be another data signal. More specifically, the other signal may be a data signal for another terminal device.

As an example, the data signal for the terminal device 200 and data signals for one or more other terminal devices are multiplexed using SPC, and the other signal may be a data signal for one of the one or more other terminal devices. In this case, the first allocation related information may indicate the difference between the power $P_{DATA,U}$ allocated to the data signal for the terminal device 200 (user U) and power $P_{DATA,V}$ allocated to the data signal for the other terminal device (user V) as follows.

$$\varepsilon_{DATA,U,V} = P_{DATA,V} - P_{DATA,U} \quad \text{[Math. 35]}$$

Of course, the first allocation related information can indicate the difference as follows.

$$\varepsilon_{DATA,U,V} = P_{DATA,U} - P_{DATA,V} \quad \text{[Math. 36]}$$

Note that the power $P_{DATA,U}$ allocated to the data signal for the terminal device 200 (user U) and the power $P_{DATA,V}$ allocated to the data signal for the other terminal device (user V) may have one of the following two relationships.

$$P_{DATA,V} - P_{DATA,U} \geq 0 \quad \text{[Math. 37]}$$

$$P_{DATA,V} - P_{DATA,U} \leq 0 \quad \text{[Math. 38]}$$

Thus, each of the differences has only a positive value or only a negative value.

Multiplexed Signal

The other signal may be a multiplexed signal including the data signal. More specifically, the data signal for the terminal device 200 and data signals for one or more other terminal devices are multiplexed using SPC, and the other signal may be a multiplexed signal including the data signal for the terminal device 200 and the data signals for the one or more terminal devices.

Other Signal

The other signal may be a signal of a physical broadcast channel (PBCH), or a synchronization signal (for example, a primary synchronization signal (PSS), a secondary synchronization signal (SSS), or the like).

Specific Information

The first allocation related information may be an index indicating the difference or the ratio. Specifically, a plurality of indices each indicating a difference or a ratio of power are prepared, and the first allocation related information may be one index among the plurality of indices indicating a difference or a ratio between power allocated to the data signal and power allocated to the other signal. The base station 100 may report the one index to the terminal device 200. Through this reporting of the index, for example, an amount of information necessary for reporting is further reduced, and overhead is reduced. Hereinbelow, examples of a plurality of indices each indicating a difference of power will be described with reference to FIGS. 12 and 13.

FIG. 12 is an explanatory diagram for describing a first example of a plurality of indices each indicating a difference of power. Referring to FIG. 12, N indices each indicating a difference of power are shown. An index 0, for example, indicates 0 (dBm) which is a lower limit difference, an index 1 indicates 0.5 (dBm), and an index 2 indicates 1.0 (dBm). An index N−1, for example, indicates 0.5*(N−1) (dBm) which is an upper limit difference, an index N−2 indicates 0.5*(N−2) (dBm), and an index N−3 indicates 0.5*(N−3) (dBm). In this manner, indices indicating differences at increments of 0.5 dBm are prepared between 0 (dBm) and 0.5*(N−1) (dBm), and the first allocation related information indicates one of the indices 0 to N−1. Note that N in the example of FIG. 12 may be the same as or different from N in the example of FIG. 11.

FIG. 13 is an explanatory diagram for describing a second example of a plurality of indices each indicating a difference of power. Referring to FIG. 13, N indices each indicating a difference of power are shown. An index 0, for example, indicates −0.5*(N−1) (dBm) which is a lower limit difference, an index 2 indicates −0.5*(N−2) (dBm), and an index 3 indicates −0.5*(N−3) (dBm). An index N−1, for example, indicates 0 (dBm) which is an upper limit difference, an index N−2 indicates −0.5 (dBm), and an index N−3 indicates −1.0 (dBm). In this manner, indices indicating differences are prepared at increments of 0.5 dBm between −0.5*(N−1) (dBm) and 0 (dBm), and the first allocation related information indicates one of the indices 0 to N−1. Note that N in the example of FIG. 13 may be the same as or different from N in the example of FIG. 11.

The plurality of indices and a difference or a ratio indicated by each of the plurality of indices are held in, for example, the terminal device 200. Accordingly, the terminal device 200 can, for example, ascertain a difference of power from an index reported by the base station 100 to the terminal device 200.

Note that the first allocation related information may be a value of the difference, instead of the index. Accordingly, for example, power can be allocated to the data signal more freely.

As described above, the first allocation related information may be information indicating a difference or a ratio between power allocated to the data signal and power allocated to the other signal. A range of values that can be set for the difference or the ratio can be narrower than a range of values that can be set for the power allocated to the data signal. Thus, an amount of information necessary for reporting is reduced, and overhead can be reduced.

(2) Reporting of Information on Power Allocation to UERS

The base station 100 (the information acquisition unit 153) acquires, for example, other information on power allocation to a user-specific reference signal (hereinafter will be referred to as "second allocation related information"). Then, the base station 100 (the reporting unit 155) reports the second power allocation information to the terminal device 200.

(a) User-Specific Reference Signal

The user-specific reference signal is, for example, a reference signal unique to the terminal device 200. In other words, the user-specific reference signal is a user-specific reference signal for the terminal device 200. The user-specific reference signal is, for example, a UERS.

The user-specific reference signal is, for example, a signal transmitted using the same antenna port as the data signal for the terminal device 200. In this case, when, for example, the data signal is transmitted using the same antenna port as the user-specific reference signal (for example, UERS), the base station 100 reports the second allocation related information to the terminal device 200.

(b) Second Allocation Related Information (b-1) Power Allocated to UERS

The second allocation related information is, for example, information indicating power allocated to the user-specific reference signal. As an example, the power is power per unit resource (i.e., a power density).

Specifically, for example, the second allocation related information is an index indicating the power allocated to the user-specific reference signal. For example, a plurality of indices each indicating power are prepared, and power indicated by one index among the plurality of indices is allocated to the user-specific reference signal. In addition, the second allocation related information is the one index, and the base station 100 reports the one index to the terminal device 200. Through this reporting of the index, for example, an amount of information necessary for reporting is further reduced, and overhead is reduced. An example of a plurality of indices each indicating power will be described hereinbelow with reference to FIG. 14.

FIG. 14 is an explanatory diagram for describing an example of a plurality of indices each indicating power. Referring to FIG. 14, N indices each indicating power are shown. An index 0, for example, indicates $P_{UERS,L}$ (dBm) which is lower limit power, an index 1 indicates $P_{UERS,L}+0.5$ (dBm), and an index 2 indicates $P_{UERS,L}+1.0$ (dBm). An index N−1, for example, indicates $P_{UERS,H}$ (dBm) which is upper limit power, an index N−2 indicates $P_{UERS,H}-0.5$ (dBm), and an index N−3 indicates $P_{UERS,H}-1.0$ (dBm). In this manner, indices indicating power are prepared at increments of 0.5 dBm between $P_{UERS,L}$ and $P_{UERS,H}$, and the second allocation related information indicates one of the indices 0 to N−1. Note that N in the example of FIG. 14 may be the same as N in any one of the examples of FIGS. 11, 12, and 13, or different from N in any one of the examples FIGS. 11, 12, and 13.

The plurality of indices and power indicated by each of the plurality of indices are held in, for example, the terminal device 200. Accordingly, for example, the terminal device 200 can ascertain power from an index reported by the base station 100 to the terminal device 200.

Note that the second allocation related information may be a value of power allocated to the user-specific reference signal, instead of the index. Accordingly, for example, power can be allocated to the data signal more freely.

(b-2) Difference Between Power Allocated to User-Specific Reference Signal and Power Allocated to Another Signal The second allocation related information may be information indicating the difference or ratio between power allocated to the user-specific reference signal and power allocated to another signal. The difference may be a difference in a decibel form, and the ratio may be a ratio in a linear form.

Another Signal

The other signal may be a signal transmitted using the same antenna port as the user-specific reference signal.

Alternatively, the other signal may be a signal transmitted using the same one or more physical antenna elements as the user-specific reference signal.

Reference Signal

The other signal may be a reference signal.

CRS

As a first example, the reference signal may be a cell-specific reference signal (CRS). In this case, the second allocation related information may indicate the difference between power $P_{UERS,U}$ allocated to a user-specific reference signal for the terminal device 200 (user U) and power $P_{CRS}$ allocated to a CRS as follows.

$$\varepsilon_{CRS,U}=P_{CRS}-P_{UERS,U} \qquad \text{[Math. 39]}$$

Of course, the second allocation related information may indicate the difference as follows.

$$\varepsilon_{CRS,U}=P_{UERS,U}-P_{CRS} \qquad \text{[Math. 40]}$$

UERS

As a second example, the reference signal may be a user-specific reference signal for another terminal device (in other words, a reference signal unique to another terminal device). The user-specific reference signal may be a UERS. In this case, the second allocation related information may indicate the difference between power $P_{UERS,U}$ allocated to a user-specific reference signal (UERS) for the terminal device 200 (user U) and power $P_{UERS,V}$ allocated to the user-specific reference signal (UERS) for the other terminal device (user V) as follows.

$$\varepsilon_{UERS,U,V}=P_{UERS,V}-P_{UERS,U} \qquad \text{[Math. 41]}$$

Of course, the second allocation related information may indicate the difference as follows.

$$\varepsilon_{UERS,U,V}=P_{UERS,U}-P_{UERS,V} \qquad \text{[Math. 42]}$$

Note that the power $P_{UERS,U}$ allocated to the user-specific reference signal for the terminal device 200 (user U) and the power $P_{UERS,V}$ allocated to the user-specific reference signal (UERS) for the other terminal device (user V) may have one of the following two relationships.

$$P_{UERS,V}-P_{UERS,U}\geq 0 \qquad \text{[Math. 43]}$$

$$P_{UERS,V}-P_{UERS,U}\leq 0 \qquad \text{[Math. 44]}$$

Accordingly, each of the difference has only a positive value or only a negative value.

Other

Note that the reference signal may be a reference signal of another type (for example, an MBSFN RS, a CSI RS, or the like).

Data Signal

The other signal may be a data signal.

Data Signal for Terminal Device 200

The data signal may be the data signal for the terminal device 200. In this case, the second allocation related information may indicate the difference between the power $P_{UERS,U}$ allocated to the user-specific reference signal for the terminal device 200 (user U) and the power $P_{DATA,U}$ allocated to the data signal for the terminal device 200 (user U) as follows.

$$\varepsilon_{DATA,U}=P_{DATA,U}-P_{UERS,U} \qquad \text{[Math. 45]}$$

Of course, the second allocation related information may indicate the difference as follows.

$$\varepsilon_{DATA,U}=P_{UERS,U}-P_{DATA,U} \qquad \text{[Math. 46]}$$

Data Signal for Another Terminal Device

The data signal may be a data signal for another terminal device.

As an example, the data signal for the terminal device 200 and data signals for one or more other terminal devices are multiplexed using SPC, and the other signal may be a data signal for one of the one or more other terminal devices. In this case, the second allocation related information may indicate the difference between the power $P_{UERS,U}$ allocated to the user-specific reference signal for the terminal device 200 (user U) and the power $P_{DATA,V}$ allocated to the data signal for the other terminal device (user V) as follows.

$$\varepsilon_{DATA,U,V} = P_{DATA,V} - P_{UERS,U} \quad \text{[Math. 47]}$$

Of course, the second allocation related information may indicate the difference as follows.

$$\varepsilon_{DATA,U,V} = P_{UERS,U} - P_{DATA,V} \quad \text{[Math. 48]}$$

Note that the power $P_{UERS,U}$ allocated to the user-specific reference signal for the terminal device 200 (user U) and the power $P_{DATA,V}$ allocated to the data signal for the other terminal device (user V) may have one of the following two relationships.

$$P_{DATA,V} - P_{UERS,U} \geq 0 \quad \text{[Math. 49]}$$

$$P_{DATA,V} - P_{UERS,U} \leq 0 \quad \text{[Math. 50]}$$

Thus, each of the differences has only a positive value or a negative value.

Multiplexed Signal

The other signal may be a multiplexed signal including the user-specific reference signal. More specifically, the user-specific reference signal for the terminal device 200 and user-specific reference signals for one or more other terminal devices are multiplexed using SPC, and the other signal may be the multiplexed signal including the user-specific reference signal for the terminal device 200 and the user-specific reference signals for the one or more other terminal devices.

Specific Information

The second allocation related information may be an index indicating the difference or the ratio. Specifically, a plurality of indices each indicating a difference or a ratio of power are prepared, and the second allocation related information may be one index among the plurality of indices indicating a difference or a ratio between power allocated to the user-specific reference signal and power allocated to the other signal. The base station 100 may report the one index to the terminal device 200. Through this reporting of the index, for example, an amount of information necessary for reporting is further reduced, and overhead is reduced. Note that a specific example of the plurality of indices each indicating a difference of power is the same as those in the examples of FIGS. 12 and 13.

The plurality of indices and a difference or ratio indicated by each of the plurality of indices are held in, for example, the terminal device 200. Accordingly, for example, the terminal device 200 can ascertain the difference of power from an index reported by the base station 100 to the terminal device 200.

Note that the second allocation related information may be a value of the difference, instead of the index. Accordingly, for example, power can be allocated to the user-specific reference signals more freely.

As described above, the second allocation related information may be information indicating a difference or ratio between power allocated to the user-specific reference signal and power allocated to the other signal. A range of values that can be set for the difference or the ratio can be narrower than a range of values that can be set for the power allocated to the user-specific reference signal. Thus, an amount of information necessary for reporting can be further reduced, and overhead can be reduced.

(3) Reporting of Information Included in Downlink Control Information (a) First Allocation Related Information The base station 100 (the reporting unit 155) reports, to the terminal device 200, for example, the first allocation related information included in downlink control information for the terminal device 200. As described above, the first allocation related information is information on power allocation to a data signal (for example, a data signal for the terminal device 200) serving as a target for multiplexing using SPC. Note that the downlink control information may be referred to as DCI.

(b) Ranking Information

The base station 100 (the reporting unit 155) reports, for example, information indicating a power ranking of the data signal among a plurality of data signals serving as a target for multiplexing using SPC (hereinafter referred to as "ranking information") to the terminal device 200.

More specifically, when a power level of the data signal is the highest among power levels of M data signals (i.e., M power levels) serving as a target for multiplexing using SPC, for example, the ranking information thereof indicates 0. When the power level of the data signal is the lowest among the power levels of the M data signals (i.e., M power levels), the ranking information thereof indicates M−1.

The base station 100 (the reporting unit 155) reports, for example, the ranking information included in the downlink control information to the terminal device 200.

(c) Second Allocation Related Information

The base station 100 (the reporting unit 155) reports, for example, the second allocation related information included in the downlink control information to the terminal device 200. The first allocation related information is information on power allocation to a user-specific reference signal (for example, a user-specific reference signal for the terminal device 200) as described above.

(d) Format of Downlink Control Information

The downlink control information has, for example, a format applicable to multiplexing using SPC. The format may also be called a DCI format.

(e) Example of Information Elements Included in Downlink Control Information

FIG. 15 is an explanatory diagram for describing an example of information elements included in downlink control information. Referring to FIG. 15, information elements that can be included in downlink control information according to the first embodiment are shown.

Downlink control information includes, for example, one or more of a carrier indicator, a resource allocation header, a TPC command for uplink, a downlink assignment index, a HARQ process number, an antenna port, a scrambling pattern, an interleaving pattern, a layer, a sounding reference signal (SRS) request, a modulation and coding scheme (MCS), a new data indicator, and a redundancy version. These information elements are information elements defined in LTE or LTE-A.

In particular, in the first embodiment, the downlink control information includes, for example, SCH power, an SCH power offset from a UERS, or an SCH power offset from a CRS as the first allocation related information. SCH stands for a shared channel (SCH), and is, for example, a physical downlink shared channel (PDSCH) or a channel similar thereto. In other words, SCH power is power allocated to a data signal, an SCH power offset from a UERS is the difference between power allocated to a data signal and power allocated to a UERS, and an SCH power offset from a CRS is the difference between power allocated to a data signal and power allocated to a CRS.

Furthermore, the downlink control information includes, for example, UERS power, a UERS power offset from SCH, and a UERS power offset from CRS as the second allocation related information. In other words, UERS power is power allocated to a UERS, a UERS power offset from an SCH is the difference between power allocated to a UERS and power allocated to a data signal, and a UERS power offset from a CRS is the difference between power allocated to a UERS and power allocated to a CRS.

In addition, the downlink control information includes, for example, an SPC power ranking as the ranking information.

(f) Substitutive Means

The base station 100 (the reporting unit 155) may report, to the terminal device 200, the first allocation related information, the second allocation related information and/or the ranking information included in a signaling message (for example, RRC signaling) for the terminal device 200, instead of the downlink control information. Alternatively, the base station 100 (the reporting unit 155) may report, to the terminal device 200, the first allocation related information, the second allocation related information and the downlink control information/or the ranking information included in reporting information (for example, system information), instead of the downlink control information.

(g) Specific Operation

By generating report information that includes the first allocation related information, for example, the reporting unit 155 reports the first allocation related information to the terminal device 200. The transmission processing unit 157 transmits the report information generated by the reporting unit 155 to the terminal device 200 via, for example, the antenna unit 110 and the radio communication unit 120.

The report information is, for example, the downlink control information for the terminal device 200. Alternatively, the report information may be the signaling message for the terminal device 200.

(4) Report of Information in Form According to Antenna Port (a) First Allocation Related Information The first allocation related information (i.e., information on power allocation to a data signal serving as a target for multiplexing using SPC) may be information in a form according to an antenna port to be used in transmission of the data signal. The data signal is, for example, a data signal for the terminal device 200.

More specifically, the base station 100 (the reporting unit 155) may select a form of the first allocation related information according to an antenna port to be used in transmission of the data signal.

The first allocation related information may be in one of the following forms, as described above.

(1A) Information indicating power allocated to a data signal for the terminal device 200

(1B) Information indicating the difference between power allocated to a data signal for the terminal device 200 and power allocated to a CRS (1C) Information indicating the difference between power allocated to a data signal for the terminal device 200 and power allocated to a UERS for the terminal device 200

(1D) Information indicating the difference between power allocated to a data signal for the terminal device 200 and power allocated to a data signal for another terminal device (1E) Information indicating the difference between power allocated to a data signal for the terminal device 200 and power allocated to a UERS for another terminal device (b) Second allocation related information The second allocation related information (i.e., other information on power allocation to a user-specific reference signal) may also be information in a form according to such an antenna port. The user-specific reference signal is, for example, a user-specific reference signal for the terminal device 200 to be transmitted using the antenna port as described above. The user-specific reference signal is, for example, a UERS as described above.

More specifically, the base station 100 (the reporting unit 155) may select a form of the second allocation related information according to such an antenna port.

The second allocation related information may be in one of the following forms as described above.

(2A) Information indicating power allocated to a UERS for the terminal device 200

(2B) Information indicating the difference between power allocated to a UERS for the terminal device 200 and power allocated to a CRS (2C) Information indicating the difference between power allocated to a UERS for the terminal device 200 and power allocated to a data signal for the terminal device 200

(2D) Information indicating the difference between power allocated to a UERS for the terminal device 200 and power allocated to a UERS for another terminal device (2E) Information indicating the difference between power allocated to a UERS for the terminal device 200 and power allocated to a data signal for another terminal device (2F) No reporting (c) Relationship of Transmission Mode and Antenna Port Antenna ports to be used in transmission of a data signal vary depending on transmission modes (TMs). Examples of relationships of TMs and antenna ports will be described below with reference to FIG. 16.

FIG. 16 is an explanatory diagram for describing the examples of the relationships of transmission modes (TMs) and antenna ports. Referring to FIG. 16, (typical) transmission schemes used in the transmission modes 1 to 10 and antenna ports are shown. In the transmission mode 2, for example, one or more of antenna ports 0 to 3 are used for transmission of a data signal. In the transmission mode 5, one or more of antenna ports 1 to 5, 7, and 8 are used for transmission of a data signal.

(d) Relationship of Antenna Port and Reference Signal

Reference signals to be transmitted vary depending on antenna ports. Examples of relationships of antenna ports and reference signals will be described below with reference to FIG. 17.

FIG. 17 is an explanatory diagram for describing examples of relationships of antenna ports and reference signals. Referring to FIG. 17, reference signals each to be transmitted using antenna ports 0 to 22 are shown. A CRS is transmitted using, for example, antenna ports 0 to 3. A UERS is transmitted using antenna ports 5, and 7 to 14. Note that an MBSFN RS is transmitted using an antenna port 4, a positioning RS is transmitted using an antenna port 6, and a CSI RS is transmitted using antenna ports 15 to 22.

(e) Information in Form According to Antenna Port
(e-1) Case in which Data Signal and CRS are Transmitted Using Same Antenna Port As a first example, a data signal for the terminal device 200 is transmitted using one of antenna ports 0 to 3. That is, the data signal for the terminal device 200 and a CRS are transmitted using the same antenna port. An example of first allocation related information in this case will be described below with reference to FIG. 18.

FIG. 18 is an explanatory diagram for describing examples of forms of first allocation related information in a case in which a data signal for the terminal device 200 and a CRS are transmitted using the same antenna port. Referring to FIG. 18, the above-described (1A) to (1E) are shown as forms of the first allocation related information (i.e., information on power allocation to a data signal for the terminal device 200). Since an antenna port to be used in transmission of a CRS, for example, is not used in transmission of a UERS, in this case, (1C) and (1E) are not selected as a form of the first allocation related information. In this case, (1A) and (1B) may be selected as forms of the first allocation related information for a more stable operation. That is, the first allocation related information is information indicating power allocated to a data signal for the terminal device 200, or information indicating the difference between power allocated to a data signal for the terminal device 200 and power allocated to a CRS.

Note that (1D) may be selected as a form of the first allocation related information. That is, the first allocation related information may be information indicating the difference between power allocated to a data signal for the terminal device 200 and power allocated to a data signal for another terminal device (for example, a data signal to be multiplexed with the data signal for the terminal device 200). In this case, the information indicating the power allocated to the data signal for the other terminal device (i.e., information in a form similar to (1A)), or information indicating the difference between the power allocated to the data signal for the other terminal device and power allocated to the CRS (i.e., information in a form similar to (1B)) may be reported to terminal devices including the terminal device 200.

(e-2) Case in which Data Signal and UERS are Transmitted Using Same Antenna Port As a second example, a data signal for the terminal device 200 is transmitted using one of antenna ports 5 and 7 to 14. That is, the data signal for the terminal device 200 and a UERS are transmitted using the same antenna port. Examples of forms of first allocation related information and second allocation related information in this case will be described below with reference to FIG. 19.

FIG. 19 is an explanatory diagram for describing examples of forms of first allocation related information and forms of second allocation related information in the case in which a data signal for the terminal device 200 and a UERS are transmitted using the same antenna port. Referring to FIG. 19, the above-described (1A) to (1E) are shown as forms of the first allocation related information (i.e., information on power allocation to the data signal for the terminal device 200). Furthermore, the above-described (2A) to (2F) are shown as forms of the second allocation related information (i.e., information on power allocation to the UERS for the terminal device 200). When, for example, (1C) is selected as a form of the first allocation related information, (2C), (2E), and (2F) are not selected as forms of the second allocation related information. When (1E) is selected as a form of the first allocation related information, for example, (2C) is not selected as a form of the second allocation related information. In this case, (1A) or (1C) may be selected as a form of the first allocation related information and (2A) may be selected as a form of the second allocation related information for a more stable operation.

Note that (1D) may be selected as a form of the first allocation related information. Description of this point is the same as in the example of FIG. 18. Thus, overlapping description will not be provided.

Likewise, (2C) may be selected as a form of the second allocation related information.

(2D) may be selected as a form of the second allocation related information. That is, the second allocation related information may be information indicating the difference between power allocated to a UERS for the terminal device 200 and power allocated to a UERS for another terminal device. In this case, information indicating the power allocated to the UERS of the other terminal device (i.e., information in a form similar to (2A)) may be reported to terminal devices including the terminal device 200.

Although antenna ports used in transmission of a UERS are not used in transmission of a CRS, an antenna port used in transmission of the UERS and an antenna port used in transmission of the CRS can correspond to the same physical antenna element. In such a case, (1B) may be selected as a form of the first allocation related information, and (2B) may be selected as a form of the second allocation related information.

(5) Power Allocation
(a) Decision on Power to be Allocated to Data Signal

The base station 100 (the power decision unit 151) decides on, for example, a level of power to be allocated to a data signal serving as a target for multiplexing using SPC. The data signal is, for example, a data signal for the terminal device 200.

The first allocation related information is, for example, information indicating power allocated to the data signal as described above. In this case, the base station 100 (the power decision unit 151) can more freely decide on a level of power to be allocated to the data signal in consideration of maximum transmission power. Note that, when the first allocation related information is an index as described above, a level of power indicated by any index is decided on as the power to be allocated to the data signal.

The first allocation related information may be information indicating the difference between power allocated to the data signal and power allocated to another signal as described above. In this case, the base station 100 (the power decision unit 151) may decide on a level of power to be allocated to the data signal in consideration of power allocated to the other signal and maximum transmission power. Note that, when the first allocation related information is an index as described above, the difference between (or the sum of) a difference indicated by any index and power allocated to the other signal may be decided on as the power to be allocated to the data signal.

Note that the base station 100 (the power decision unit 151) also decides on a level of power to be allocated to a data signal for another terminal device.

(b) Decision on Power to be Allocated to User-Specific Reference Signal

The base station 100 (the power decision unit 151) decides on, for example, a level of power to be allocated to a user-specific reference signal. The user-specific reference signal is, for example, a user-specific reference signal for the terminal device 200 (in other words, a reference signal unique to the terminal device 200), and is a UERS. The user-specific reference signal is, for example, a signal transmitted using the same antenna port as the data signal.

The second allocation related information is, for example, information indicating power allocated to the user-specific reference signal as described above. In this case, the base station 100 (the power decision unit 151) can more freely decide on a level of power to be allocated to the user-specific reference signal in consideration of maximum transmission power. Note that, when the second allocation related information is an index as described above, a level of power indicated by any index may be decided on as the power to be allocated to the user-specific reference signal.

The second allocation related information may be information indicating the difference between power allocated to the user-specific reference signal and power allocated to another signal as described above. In this case, the base station 100 (the power decision unit 151) may decide on a level of power to be allocated to the user-specific reference signal in consideration of power allocated to the other signal and maximum transmission power. Note that, when the second allocation related information is an index as described above, the difference between (or the sum of) a difference indicated by any index and the power allocated to the other signal may be decided on as the power to be allocated to the user-specific reference signal.

Note that the base station 100 (the power decision unit 151) of course decides on a level of power to be allocated to a user-specific reference signal for another terminal device as well.

(c) Decision on Power to be Allocated to Another Signal

The base station 100 (the power decision unit 151) may also decide on a level of power to be allocated to another signal. The other signal may include a CRS and/or another reference signal (an MBSFN RS, a CSI RS, or the like).

(d) Generation of Allocation Related Information

The base station 100 (the power decision unit 151) generates the first allocation related information (i.e., information on power allocation to the data signal) after, for example, the decision on power to be allocated to the data signal.

The base station 100 (the power decision unit 151) generates the second allocation related information (i.e., information on power allocation to the user-specific reference signal) after, for example, the decision on power to be allocated to the user-specific reference signal.

(e) Power Allocation

The base station 100 (the transmission processing unit 157) allocates, for example, power decided on as described above to the data signal. Specifically, for example, the base station 100 (the transmission processing unit 157) allocates decided power to the data signal as illustrated in FIGS. 1 and 3.

The base station 100 (the transmission processing unit 157) allocates, for example, power decided on as described above to the user-specific reference signal (for example, a UERS). Specifically, for example, the base station 100 (the transmission processing unit 157) allocates the decided power to the user-specific reference signal (for example, a UERS) as illustrated in FIG. 3.

(6) Decoding of Data Signal

The terminal device 200 (the information acquisition unit 241) acquires information on power allocation to a data signal (i.e., first allocation related information) serving as a target for multiplexing using SPC. In addition, the terminal device 200 (the reception processing unit 245) decodes the data signal on the basis of the first allocation related information. The data signal is, for example, a data signal for the terminal device 200 as described above.

The terminal device 200 (the reception processing unit 245), for example, computes reception power of the data signal on the basis of the allocation related information, and decodes the data signal on the basis of the reception power.

(a) Acquisition of Allocation Related Information

The base station 100 reports the first allocation related information to the terminal device 200 as described above, and the terminal device 200 (the information acquisition unit 241) acquires the first allocation related information.

The base station 100 reports, to the terminal device 200, for example, the first allocation related information included in downlink control information for the terminal device 200 as described above. In this case, the terminal device 200 (the information acquisition unit 241) acquires the first allocation related information from the downlink control information for the terminal device 200.

Alternatively, the base station 100 may report the first allocation related information included in a signaling message for the terminal device 200 (for example, RRC signaling) to the terminal device 200, instead of the downlink control information as described above. In this case, the terminal device 200 (the information acquisition unit 241) may acquire the first allocation related information from the signaling message for the terminal device 200.

(b) Allocation-Related Information (b-1) Power Allocated to Data Signal

The first allocation related information is, for example, information indicating power allocated to the data signal as described above. In this case, the terminal device 200 (the reception processing unit 245) computes reception power of the data signal from the first allocation related information and path loss.

The terminal device 200 (the reception processing unit 245) computes the path loss on the basis of, for example, power allocated to a reference signal transmitted using the same antenna port as the data signal (i.e., transmission power) and reception power of the reference signal. The reference signal is, for example, a CRS or a user-specific reference signal (for example, a UERS) for the terminal device 200.

Note that, when the reference signal is the user-specific reference signal for the terminal device 200, the terminal device 200 (the reception processing unit 245) can ascertain the power allocated to the user-specific reference signal from the second allocation related information.

(b-2) Difference Between Power Allocated to Data Signal and Power Allocated to Another Signal The first allocation related information may be information indicating the difference or a ratio between power allocated to the data signal and power allocated to another signal. In this case, the terminal device 200 (the reception processing unit 245) may compute reception power of the data signal on the basis of the first allocation related information and reception power of the other signal.

The other signal may be a reference signal (for example, a CRS, a user-specific reference signal, or the like), another data signal, a multiplexed signal including the data signal, or the like as described above.

(c) Interference Cancellation

The terminal device 200 (the reception processing unit 245), for example, removes one or more other data signals among a plurality of pieces of data included in a multiplexed signal including the data signal from the multiplexed signal as interference, and decodes the data signal.

(c-1) Determination of Execution of Interference Cancellation

When there is another data signal whose reception power is greater than a threshold value corresponding to reception power of the data signal among the plurality of data signals, for example, the terminal device 200 (the reception processing unit 245) removes one or more other data signals from the multiplexed signal as interference. The reason for this is that interference of the other data signals significantly affects decoding of the data signal. As an example, the threshold value is a value smaller than the reception power of the data signal by a predetermined value.

On the other hand, when there is no other data signal whose reception power is greater than the threshold value among the plurality of data signals, for example, the terminal device 200 (the reception processing unit 245) decodes the data signal without interference cancellation. The reason for this is that interference of the other data signals hardly affects decoding of the data signal.

(c-2) Computation of Reception Power of Other Data Signals

The terminal device 200 (the information acquisition unit 241) acquires, for example, information on power allocation to each of one or more other data signals serving as a target for multiplexing with the data signal for the terminal device 200, similarly to the data signal for the terminal device 200. Then, the terminal device 200 (the information acquisition unit 241) computes reception power of each of the one or more other data signals, similarly to the data signal for the terminal device 200.

(c-3) Sequential Interference Cancellation

The terminal device 200 (the reception processing unit 245) sequentially removes, for example, one or more other data signals whose reception power is greater than that of the data signal among the plurality of data signals included in the multiplexed signal from the multiplexed signal as interference. Specifically, the terminal device 200 (the reception processing unit 245) performs, for example, successive interference cancellation (SIC).

One or More Other Data Signals

The one or more other data signals are, for example, signals whose reception power is greater than that of the data signal by a predetermined amount of power or more. The reason for this is that the other data signals having greater reception power have higher communication quality and the other data signals are highly likely to be removed as interference by being correctly decoded.

Case with Ranking Information

The terminal device 200 (the information acquisition unit 241) acquires, for example, information indicating a power ranking of the data signal (i.e., ranking information) among the plurality of data signals serving as a target for multiplexing. Then, the terminal device 200 (the reception processing unit 245) sequentially removes the one or more other signals from the multiplexed signal as interference on the basis of the ranking information.

The base station 100 reports, for example, the ranking information to the terminal device 200 as described above, and the terminal device 200 (the information acquisition unit 241) acquires the ranking information.

The power ranking indicated by the ranking information can be said to mean, for example, an order of a sequential process. Thus, when the ranking information has been acquired, for example, the terminal device 200 (the reception processing unit 245) determines to sequentially remove one or more other data signals from the multiplexed signal as interference. Then, the terminal device 200 (the reception processing unit 245) sequentially removes one or more other data signals whose reception power is greater than that of the data signal for the terminal device 200 from the multiplexed signal as interference. The terminal device 200 (the reception processing unit 245) sequentially removes the one or more other data signals as interference in, for example, reception power descending order.

Note that the terminal device 200 may acquire ranking information on each of the plurality of data signals. In addition, the terminal device 200 (the reception processing unit 245) may sequentially remove one or more other data signals with higher power rankings than the data signal for the terminal device 200 from the multiplexed signal as interference. The terminal device 200 (the reception processing unit 245) may sequentially remove the one or more other data signals in power ranking descending order as interference.

Case without Ranking Information

When the base station 100 does not report the ranking information to the terminal device 200, the terminal device 200 may determine whether one or more other data signals are to be sequentially removed from the multiplexed signal as interference on the basis of reception power of the plurality of data signals included in the multiplexed signal. As an example, when the difference in reception power between the plurality of data signals exceeds a threshold value, the base station 100 may determine to sequentially remove one or more other data signals from the multiplexed signal as interference. Then, the terminal device 200 (the reception processing unit 245) may sequentially remove one or more other data signals whose reception power is greater than the data signal for the terminal device 200 from the multiplexed signal as interference. The terminal device 200 may sequentially remove the one or more other data signals in reception power descending order as interference.

(c-4) Parallel Interference Cancellation

The terminal device 200 (the reception processing unit 245) may remove one or more other data signals among the plurality of data signals included in the multiplexed signal from the multiplexed signal as interference in parallel. Specifically, the terminal device 200 (the reception processing unit 245) may perform parallel interference cancellation (PIC). Alternatively, the terminal device 200 (the reception processing unit 245) may perform elementary signal estimation (ESE). A technique including PIC, ESE, and the like can be called multi-user detection (MUD).

Specifically, when the difference in reception power between the plurality of data signals does not exceed the threshold value, the terminal device 200 (the reception processing unit 245) may remove the one or more other data signals from the multiplexed signal as interference in parallel.

4.2. Process Flow

Next, examples of process flows relating to the first embodiment will be described with reference to FIGS. 20 to 24.

(1) Overall Process

Figure 20:
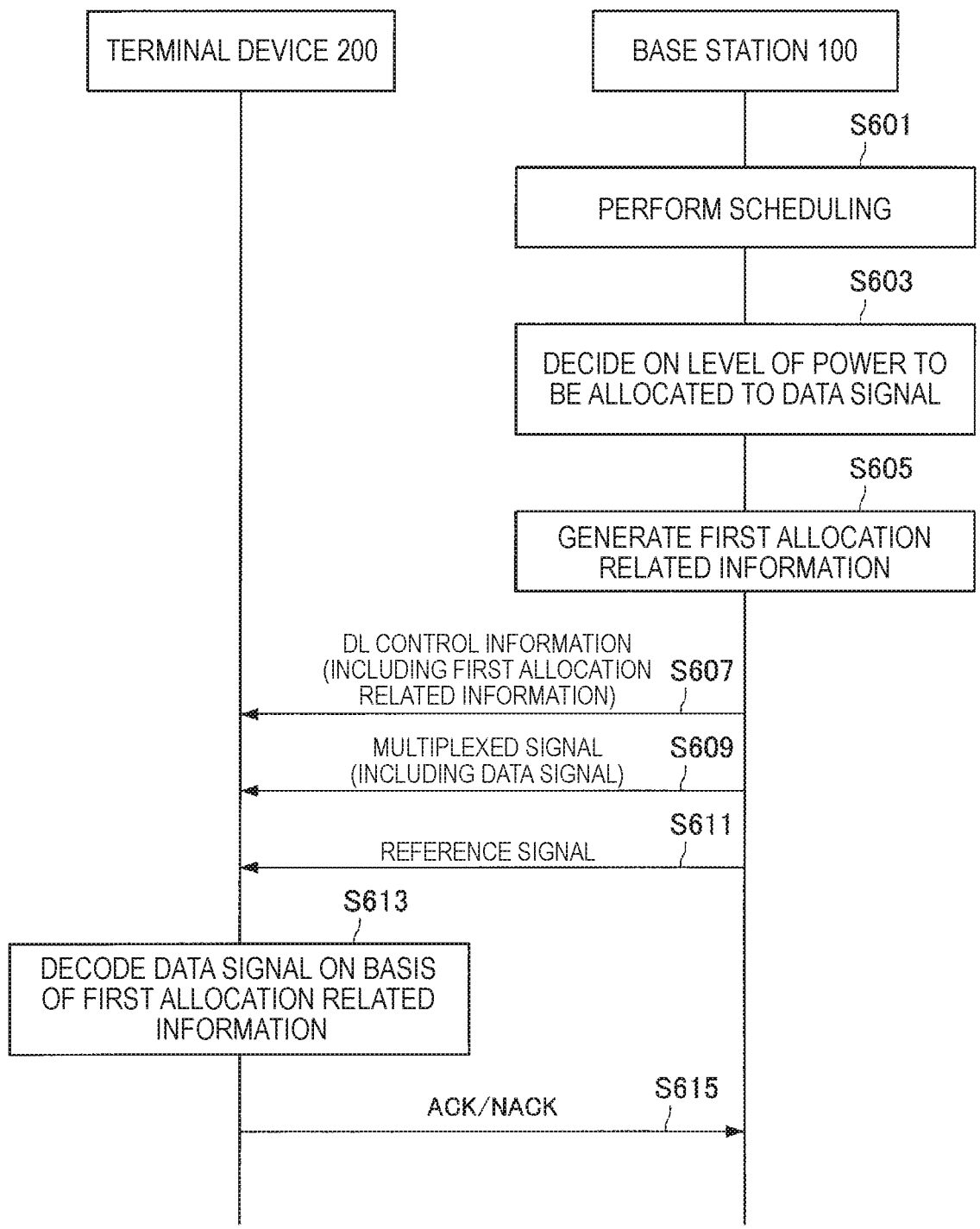
FIG. 20 is a sequence diagram showing an example of a schematic flow of an overall process according to a first embodiment.

FIG. 20 is a sequence diagram showing an example of a schematic flow of an overall process according to the first embodiment.

The base station 100 performs scheduling (S601). That is, the base station 100 allocates radio resources to terminal devices. In particular, the base station 100 allocates radio resources to the terminal device 200 for transmission of a data signal (downlink signal) for the terminal device 200.

The base station 100 also allocates such radio resources for transmission of one or more other data signals (for example, data signals for one or more other terminal devices).

Furthermore, the base station 100 (the power decision unit 151) decides on a level of power to be allocated to the data signal for the terminal device 200 (S603). The base station 100 also decides on a level of power to be allocated to the one or more other data signals.

Then, the base station 100 (the power decision unit 151) generates first allocation related information (i.e., information on power allocation to the data signal) (S605). The base station 100 also generates information on power allocation to the one or more other data signals.

Thereafter, the base station 100 (the information acquisition unit 153) obtains the first allocation related information, and the base station 100 (the reporting unit 155) reports, to the terminal device 200, the first allocation related information included in downlink control information for the terminal device 200 (S607). That is, the base station 100 transmits the downlink control information including the first allocation related information. Further, the base station 100 (the transmission processing unit 157) multiplexes the data signal for the terminal device 200 and the one or more other data signals using SPC, and transmits the multiplexed signal (S609). Further, the base station 100 (the transmission processing unit 157) also transmits a reference signal (S611).

The terminal device 200 (the information acquisition unit 241) acquires the first allocation related information from the downlink control information, and decodes the data signal for the terminal device 200 on the basis of the first allocation related information (S613). Then, the terminal device 200 transmits an acknowledgement (ACK) or a negative acknowledgement (NACK) to the base station 100 (S615).

(2) Process Performed on Terminal Device Side (a) Decoding Process

Figure 21:
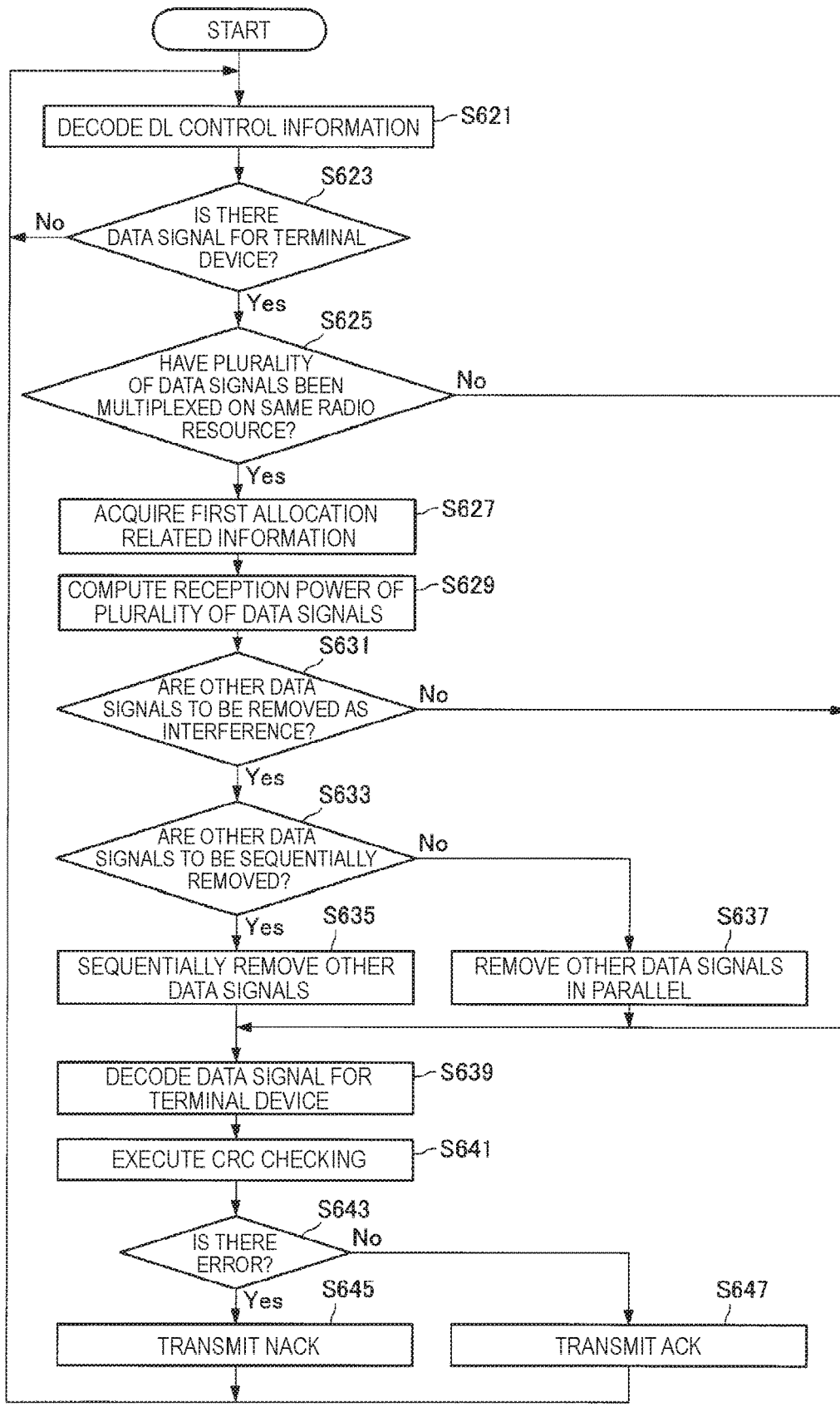
FIG. 21 is a flowchart showing an example of a schematic flow of a decoding process of a terminal device according to the first embodiment.

FIG. 21 is a flowchart showing an example of a schematic flow of the decoding process of the terminal device 200 according to the first embodiment. The decoding process corresponds to Steps S613 and S615 of FIG. 20.

The terminal device 200 (the reception processing unit 245) decodes the downlink control information (S621).

The terminal device 200 checks whether there is a data signal for the terminal device 200 in the downlink control information (S623). If there is no data signal for the terminal device 200 (No in S623), the process returns to Step S621.

If there is a data signal for the terminal device 200 (Yes in S623), the terminal device 200 checks whether a plurality of data signals (including the data signal for the terminal device 200) have been multiplexed on the same radio resource (S625).

If a plurality of data signals have been multiplexed on the same radio resource (Yes in S625), the terminal device 200 (the information acquisition unit 241) acquires information on power allocation to the data signal for the terminal device 200 (i.e., first allocation related information) from the downlink control information (S627). The terminal device 200 (the information acquisition unit 241) also acquires, for example, information on power allocation to one or more other data signals among the plurality of data signals. When the data signal for the terminal device 200 and a user-specific reference signal are transmitted using the same antenna port, the terminal device 200 (the information acquisition unit 241) may also acquire information on power allocation to the user-specific reference signal (i.e., second allocation related information).

The terminal device 200 (the reception processing unit 245) computes reception power of the plurality of data signals (S629). In particular, the terminal device 200 computes reception power of the data signal for the terminal device 200 on the basis of the first allocation related information.

The terminal device 200 (the reception processing unit 245) determines whether other data signals multiplexed with the data signal for the terminal device 200 are to be removed as interference (S631).

If the other data signals are determined to be removed as interference (Yes in S631), the terminal device 200 (the reception processing unit 245) determines whether the other data signals are to be sequentially removed (S633).

If the other data signals are determined to be sequentially removed (Yes in S633), the terminal device 200 (the reception processing unit 245) sequentially removes the other data signals (S635). If not (No in S633), the terminal device 200 (the reception processing unit 245) removes the other data signals in parallel (S637). Then, the terminal device 200 (the reception processing unit 245) decodes the data signal for the terminal device 200 (S639).

If the plurality of data signals are not multiplexed on the same radio resource (No in S625), and if the other data signals are determined not to be removed as interference (No in S631), the terminal device 200 (the reception processing unit 245) decodes the data signal for the terminal device 200 (without interference cancellation) (S639).

After decoding of the data signal for the terminal device 200, the terminal device 200 (the reception processing unit 245) performs CRC checking (S641). If there is an error as a result (Yes in S643), the terminal device 200 transmits a NACK to the base station 100 (S645), or if there is no error (No in S643), the terminal device 200 transmits an ACK to the base station 100 (S647). Then, the process returns to Step S621.

(b) First Determination Process (Determination of Execution of Interference Cancellation)

Figure 22:
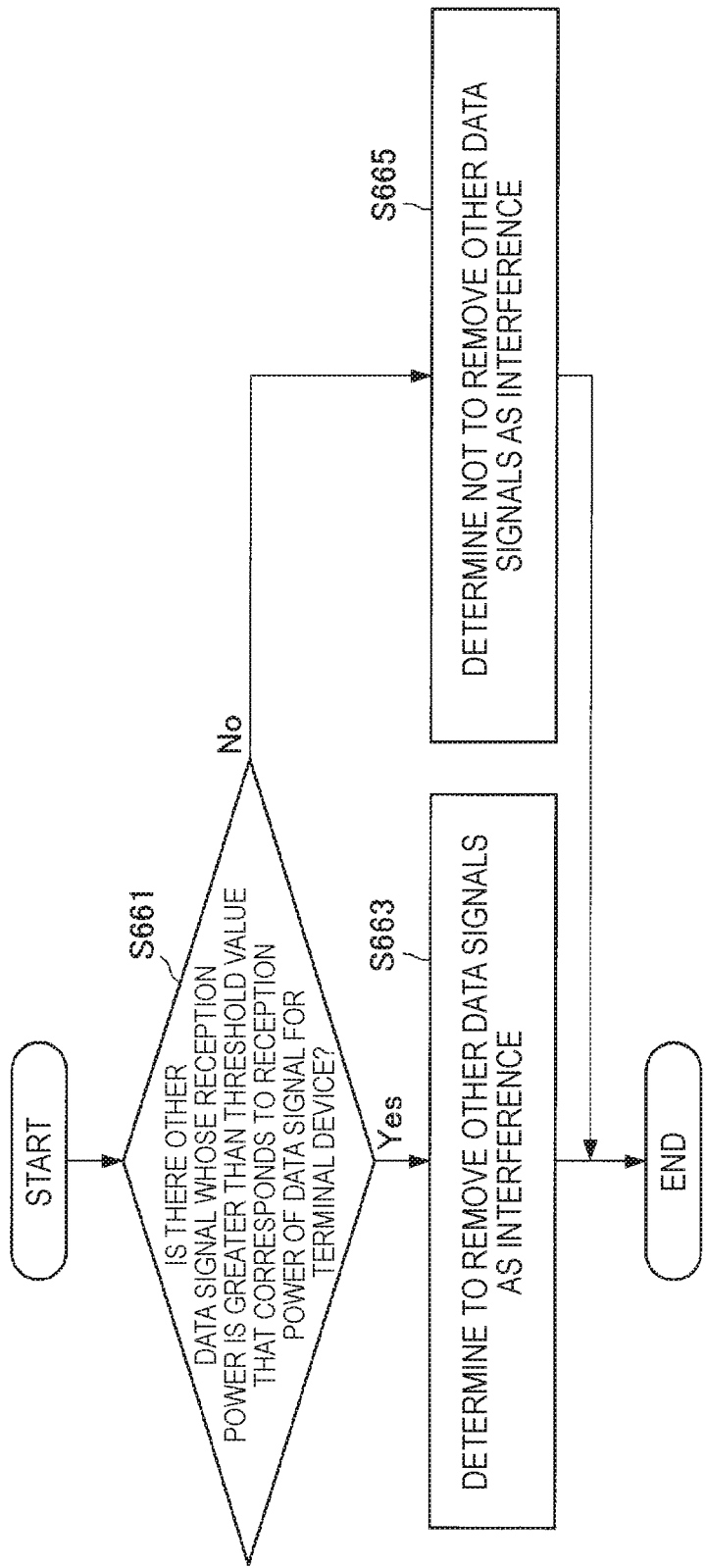
FIG. 22 is a flowchart showing an example of a schematic flow of a first determination process of the terminal device according to the first embodiment.

FIG. 22 is a flowchart showing an example of a schematic flow of a first determination process of the terminal device 200 according to the first embodiment. The first determination process is a process of determining whether other data signals are to be removed as interference, and corresponds to Step S631 in the example of FIG. 21.

The terminal device 200 (the reception processing unit 245) determines whether there are other data signals whose reception power is greater than a threshold value that corresponds to reception power of the data signal for the terminal device among the plurality of data signals included in the multiplexed signal (S661).

If there are such other data signals (Yes in S661), the terminal device 200 (the reception processing unit 245) determines that the other data signals are to be removed as interference (S663). Then, the process ends.

On the other hand, if there are no such other data signals (No in S661), the terminal device 200 (the reception processing unit 245) determines that the other data signals are not to be removed as interference (S665). Then, the process ends.

(c) Second Determination Process (Determination of Execution of Sequential Interference Cancellation)

Figure 23:
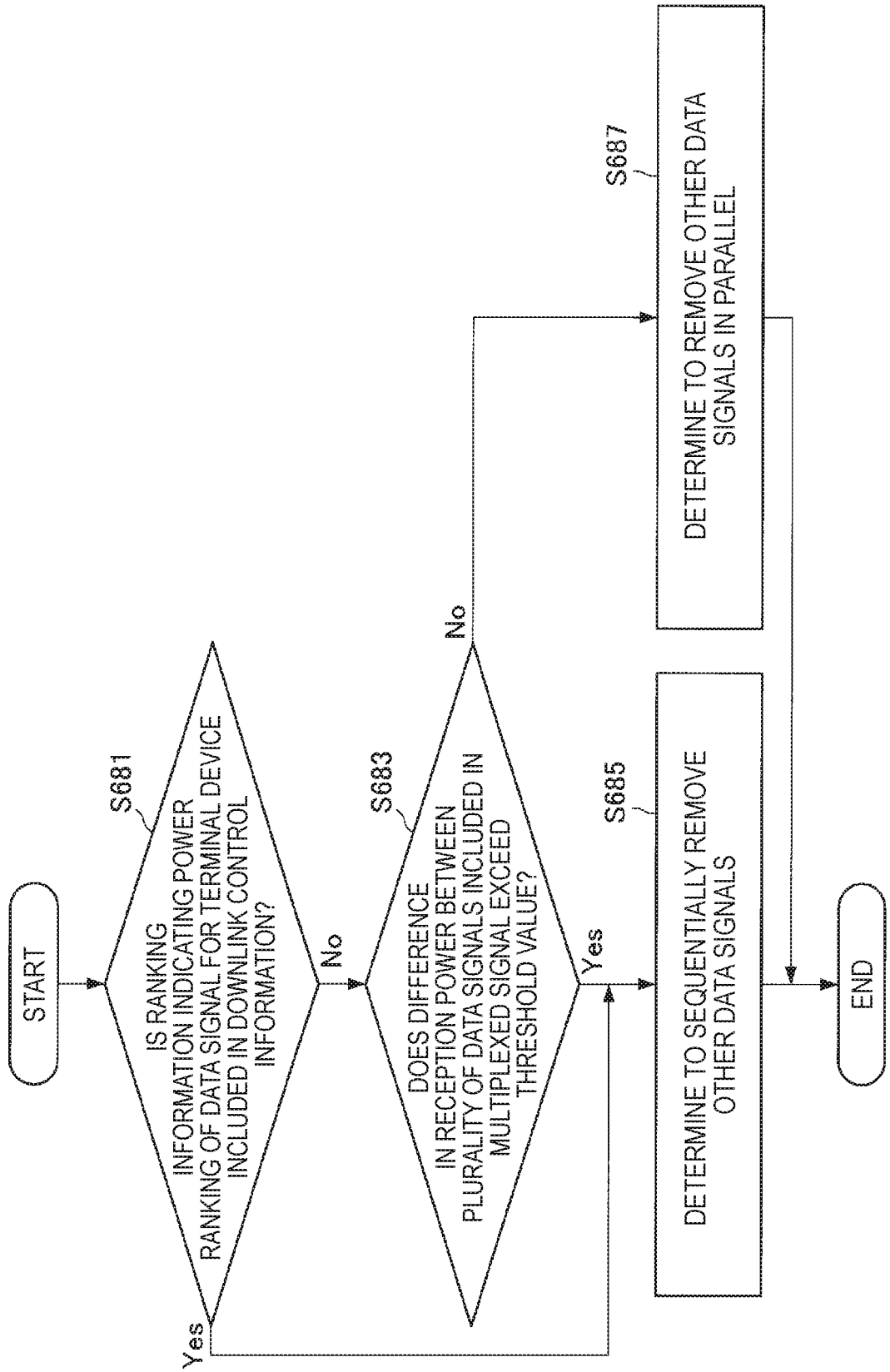
FIG. 23 is a flowchart showing an example of a schematic flow of a second determination process of the terminal device according to the first embodiment.

FIG. 23 is a flowchart showing an example of a schematic flow of a second determination process of the terminal device 200 according to the first embodiment. The second determination process is a process of determining whether other data signals are to be sequentially removed as interference, and corresponds to Step S633 in the example of FIG. 21.

If ranking information indicating a power ranking of the data signal for the terminal device 200 is included in the downlink control information (Yes in S681), the terminal device 200 (the reception processing unit 245) determines that the other data signals are to be sequentially removed as interference (S685).

Even if the information is not included in the downlink control information in the downlink control information (No in S681), and if the difference in reception power between the plurality of data signals included in the multiplexed signal exceeds the threshold value (Yes in S683), the terminal device 200 (the reception processing unit 245) determines that the other data signals are to be sequentially removed as interference (S685). Then, the process ends.

If the difference in reception power between the plurality of data signals does not exceed the threshold value (No in S683), the terminal device 200 (the reception processing unit 245) determines that the other data signals are to be removed in parallel as interference (S687). Then, the process ends.

(d) Computation of Reception Power

Figure 24:
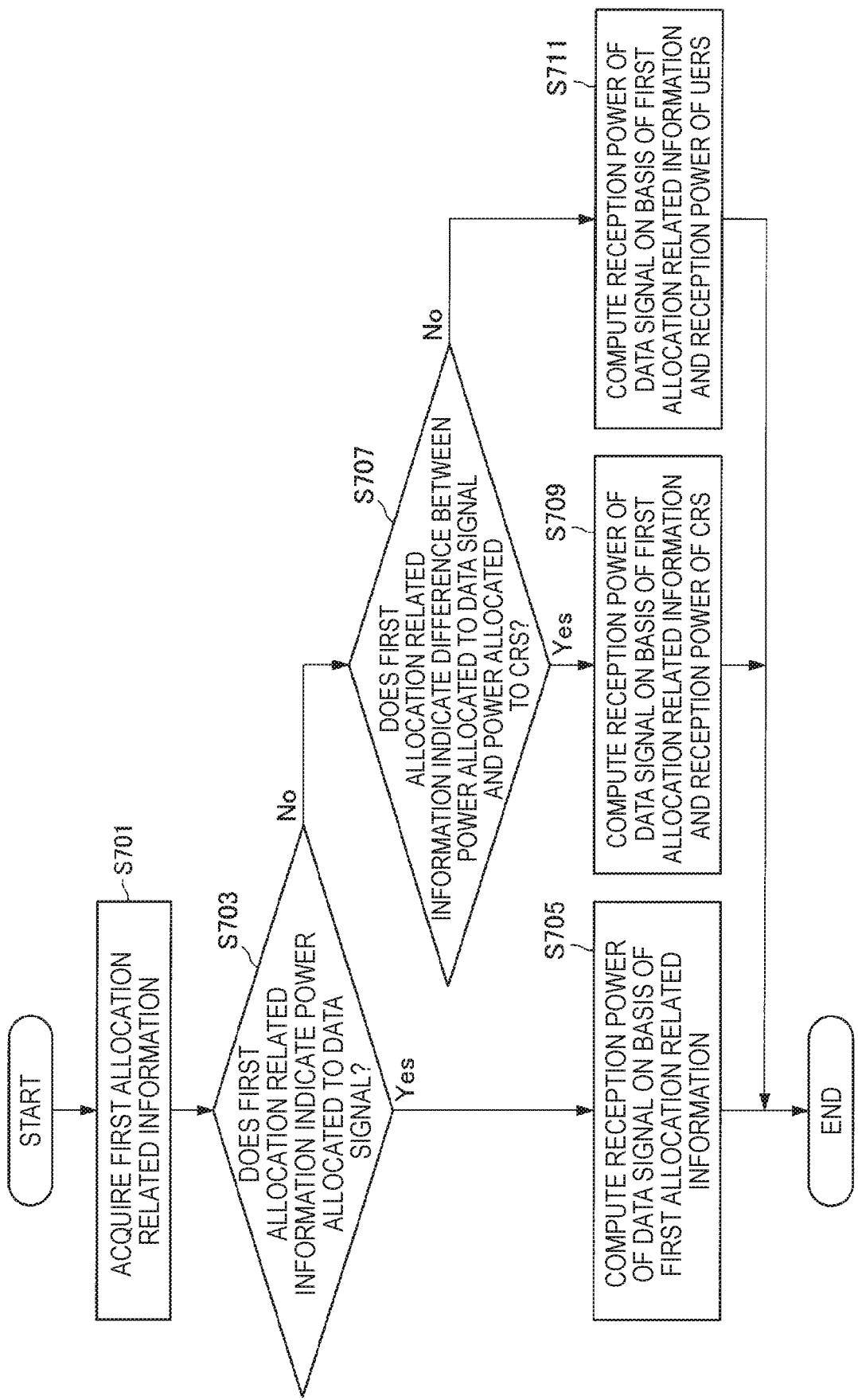
FIG. 24 is a flowchart showing an example of a schematic flow of a reception power computation process of the terminal device according to the first embodiment.

FIG. 24 is a flowchart showing an example of a schematic flow of a reception power computation process of the terminal device 200 according to the first embodiment. The reception power computation process corresponds to Step S629 in the example of FIG. 21.

The terminal device 200 (the information acquisition unit 241) acquires the first allocation related information (S701).

If the first allocation related information indicates power allocated to the data signal for the terminal device 200 (Yes in S703), the terminal device 200 (the reception processing unit 245) computes reception power of the data signal for the terminal device 200 on the basis of the first allocation related information (and path loss) (S705). Then, the process ends.

If the first allocation related information indicates the difference between power allocated to the data signal for the terminal device 200 and power allocated to a CRS (Yes in S707), the terminal device 200 (the reception processing unit 245) computes reception power of the data signal for the terminal device 200 on the basis of the first allocation related information and reception power of the CRS (S709). Then, the process ends.

If the first allocation related information indicates the difference between the power allocated to the data signal for the terminal device 200 and power allocated to a UERS (No in S707), the terminal device 200 (the reception processing unit 245) computes reception power of the data signal for the terminal device 200 on the basis of the first allocation related information and reception power of the UERS (S711). Then, the process ends.

4.3. Modified Example

Next, a modified example of the first embodiment will be described with reference to FIGS. 25 and 26.

Although a data signal serving as a target for multiplexing using SPC is a data signal for the terminal device 200 (i.e., a downlink signal) in the above-described first embodiment, the first embodiment is not limited thereto. As a modified example of the first embodiment, a data signal serving as a target for multiplexing using SPC may be a data signal from the terminal device 200 (i.e., an uplink signal).

(Terminal Device 200)

The terminal device 200 (the information acquisition unit 241) may acquire such first allocation related information. Then, the terminal device 200 (the transmission processing unit 243) may allocate power to a data signal from the terminal device 200 (i.e., an uplink signal) on the basis of the first allocation related information.

(Base Station 100)

The base station 100 (the information acquisition unit 153) may acquire such first allocation related information. Then, the base station 100 (the reporting unit 155) may report the first allocation related information to the terminal device 200.

Further, the base station 100 (the reception processing unit 159) may decode the data signal from the terminal device 200 on the basis of the first allocation related information.

Accordingly, when multiplexing is performed using SPC, for example, the base station 100 can cause the terminal device 200 to allocate power of a desired level to the data signal and can ascertain reception power of the data signal included in the multiplexed signal. Thus, the base station 100 can appropriately decode the data signal.

(Process Flow)

Overall Process

Figure 25:
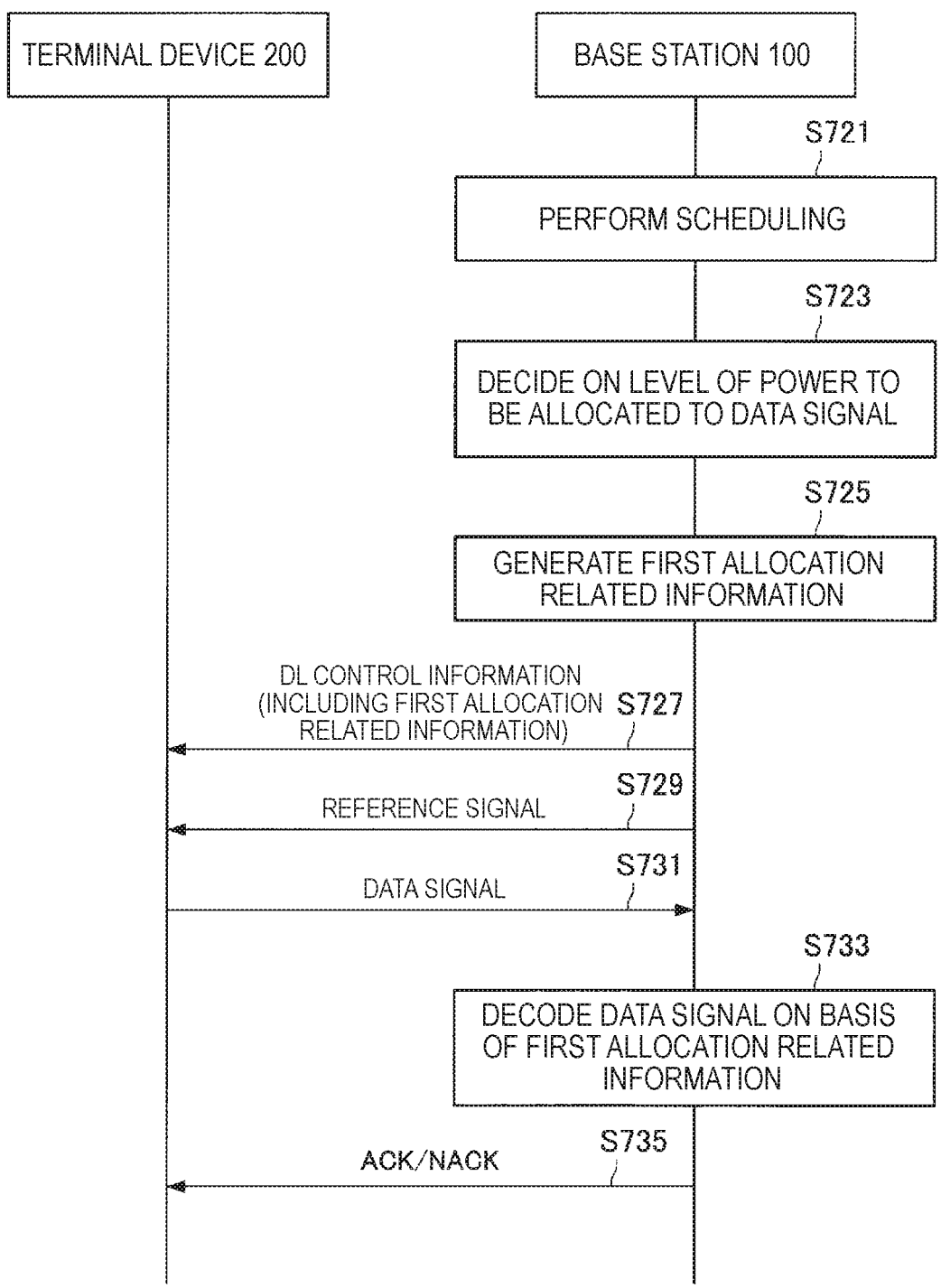
FIG. 25 is a sequence diagram showing an example of a schematic flow of an overall process according to a modified example of the first embodiment.

FIG. 25 is a sequence diagram showing an example of a schematic flow of an overall process according to the modified example of the first embodiment.

The base station 100 performs scheduling (S721). That is, the base station 100 allocates radio resources to terminal devices. In particular, the base station 100 allocates radio resources to the terminal device 200 for transmission of a data signal from the terminal device 200 (an uplink signal). In addition, the base station 100 also allocates such radio resources for transmission of one or more other data signals (for example, data signals from one or more other terminal devices).

Furthermore, the base station 100 (the power decision unit 151) decides on a level of power to be allocated to the data signal from the terminal device 200 (S723). The base station 100 also decides on a level of power to be allocated to the one or more other data signals.

Then, the base station 100 (the power decision unit 151) generates first allocation related information (i.e., information on power allocation to the data signal) (S725). The base station 100 also generates information on power allocation to the one or more other data signals.

Thereafter, the base station 100 (the information acquisition unit 153) obtains the first allocation related information, the base station 100 (the reporting unit 155) reports, to the terminal device 200, the first allocation related information included in downlink control information for the terminal device 200 (S727). That is, the base station 100 transmits the downlink control information including the first allocation related information. Further, the base station 100 (the transmission processing unit 157) also transmits a reference signal (S729).

The terminal device 200 (the information acquisition unit 241) acquires the first allocation related information from the downlink control information, and the terminal device 200 (the transmission processing unit 243) transmits the data signal from the terminal device 200 on the basis of the first allocation related information (S731). In particular, the terminal device 200 (the transmission processing unit 243) allocates power to the data signal from the terminal device 200 on the basis of the first allocation related information.

The base station 100 (the information acquisition unit 153) acquires the first allocation related information, and decodes the data signal from the terminal device 200 on the basis of the first allocation related information (S733). Note that the base station 100 (the information acquisition unit 153) also acquires information on power allocation to each of one or more other data signals multiplexed with the data signal from the terminal device 200, and decodes the one or more other data signals on the basis of the information.

Then, the base station 100 transmits an ACK or a NACK to the terminal device 200 (S735).

Decoding Process

Figure 26:
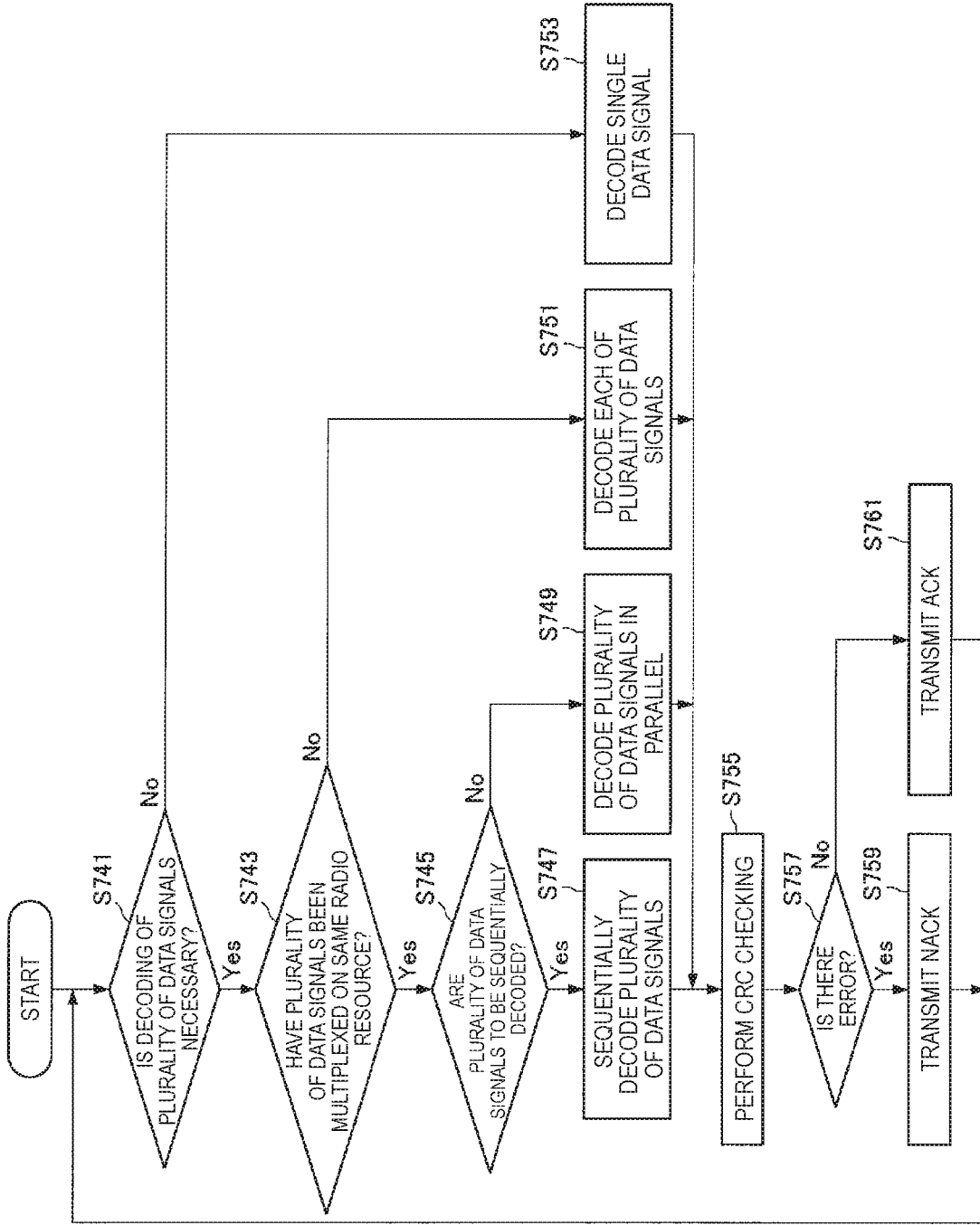
FIG. 26 is a flowchart showing an example of a schematic flow of a decoding process of a base station according to the modified example of the first embodiment.

FIG. 26 is a flowchart showing an example of a schematic flow of a decoding process of the base station 100 according to the modified example of the first embodiment. The decoding process corresponds to Steps S733 and S735 in the example of FIG. 25.

If decoding of a plurality of data signals is unnecessary (No in S741), the base station 100 (the reception processing unit 159) decodes a single data signal (S753).

If decoding of a plurality of data signals is necessary (Yes in S741) and the plurality of data signals have not been multiplexed on the same radio resource (No in S743), the base station 100 (the reception processing unit 159) decodes each of the plurality of data signals (S751).

If the plurality of data signals have been multiplexed on the same radio resource (Yes in S743), the base station 100 (the reception processing unit 159) determines whether the plurality of data signals are to be sequentially decoded (S745).

If the plurality of data signals are determined to be sequentially decoded (Yes in S745), the base station 100 (the reception processing unit 159) sequentially decodes the plurality of data signals (S747). If not (No in S745), the base station 100 (the reception processing unit 159) decodes the plurality of data signals in parallel (S749).

After decoding, the base station 100 (the reception processing unit 159) performs CRC checking (S755). If there is an error as a result (Yes in S757), the base station 100 transmits a NACK to the terminal device 200 (S759), or if there is no error (No in S757), the base station 100 transmits an ACK to the base station 100 (S761). Then, the process returns to Step S741.

Note that the plurality of data signals to be decoded include the data signal from the terminal device 200, and the single data signal to be decoded is the data signal from the terminal device 200.

5. SECOND EMBODIMENT

Next, a second embodiment of the present disclosure will be described with reference to FIGS. 26 and 27.

5.1. Technical Feature

First, technical features according to the second embodiment will be described with reference to FIG. 27.

(1) First Example (a) Power Allocation

As a first example, the base station 100 (the power decision unit 151) decides on a level of power to be allocated to a data signal for the terminal device 200 serving as a target for multiplexing using SPC and a reference signal unique to the terminal device 200 (in other words, a user-specific reference signal for the terminal device 200). In particular, the difference or ratio between the power allocated to the data signal and the power allocated to the reference signal is a predetermined difference or ratio.

(a-1) Reference Signal

The reference signal is, for example, a reference signal transmitted using the same antenna port as the data signal.

The reference signal is, for example, a UERS for the terminal device 200.

(a-2) Predetermined Difference/Predetermined Ratio

The predetermined difference is, for example, 0, and the predetermined ratio is 1:1. That is, the power allocated to the data signal is the same as the power allocated to the reference signal. A specific example of this point will be described below with reference to FIG. 27.

Figure 27:
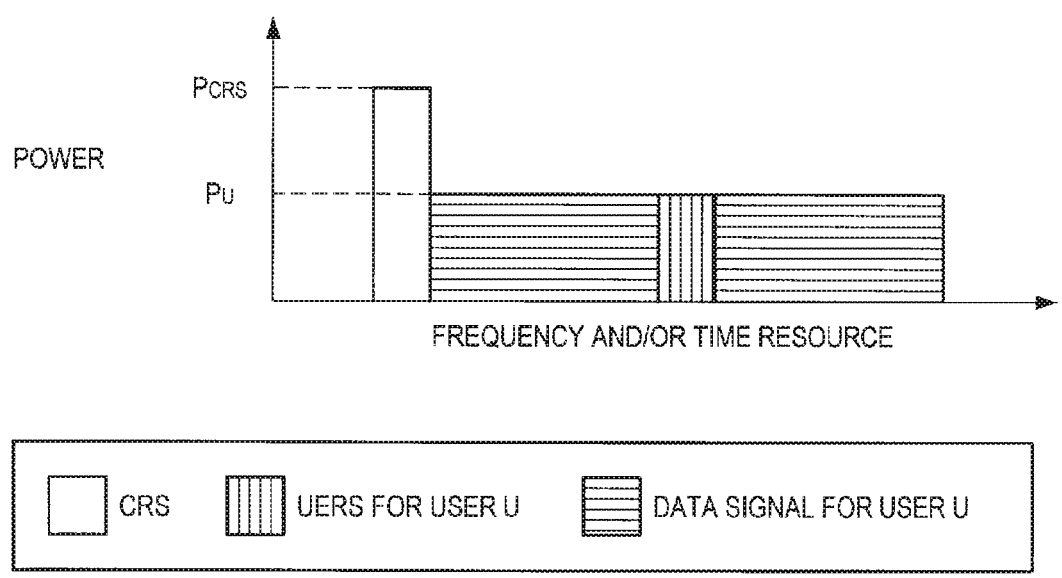
FIG. 27 is an explanatory diagram for describing a first example of power allocation according to a second embodiment.

FIG. 27 is an explanatory diagram for describing a first example of power allocation according to the second embodiment. Referring to FIG. 27, power allocated to a CRS, UERS for the user U (the terminal device 200), and a data signal for the user U (the terminal device 200) are shown. The horizontal axis represents frequency and/or time resources, and the vertical axis represents power or power density per unit resource. The power allocated to the CRS is, for example, $P_{CRS}$. In particular, the power allocated to the UERS for the user U is $P_U$, and the power allocated to the data signal for the user U is also $P_U$.

Note that the predetermined difference is not limited to 0, and the predetermined ratio is not limited to 1:1. That is, the power allocated to the data signal may not be the same as power allocated to the reference signal. The predetermined difference may be another value (for example, 0.5 dBm, or the like), and the predetermined ratio may be another ratio (for example, 2:3, or the like).

Accordingly, when multiplexing is performed using SPC, for example, the terminal device 200 can ascertain reception power of the data signal included in the multiplexed signal from reception power of the reference signal. Thus, the terminal device 200 can appropriately decode the data signal. Furthermore, since reporting of information on power allocation to the data signal, for example, is unnecessary, overhead can be reduced.

(b) Decoding

As a first example, the terminal device 200 (the reception processing unit 245) decodes the data signal for the terminal device 200 serving as a target for multiplexing using SPC on the basis of reception power of a reference signal unique to the terminal device. In particular, the difference or ratio between power allocated to the data signal and power allocated to the reference signal is a predetermined difference or ratio.

Description of the reference signal and the predetermined difference and the predetermined ratio is as described above. Thus, overlapping description will be omitted here.

The predetermined difference is, for example, 0, or the predetermined ratio is 1:1. That is, power allocated to the data signal is the same as power allocated to the reference signal. In this case, the terminal device 200 (the reception processing unit 245) deems the reception power of the reference signal as the reception power of the data signal. In addition, the terminal device 200 (the reception processing unit 245) decodes the data signal for the terminal device 200 on the basis of the reception power of the data signal (i.e., the reception power of the reference signal).

Alternatively, power allocated to the data signal may not be the same as power allocated to the reference signal. In this case, the terminal device 200 (the reception processing unit 245) may compute reception power of the data signal from reception power of the reference signal, and may decode the data signal for the terminal device 200 on the basis of the reception power of the data signal.

(2) Second Example (a) Power Allocation

As a second example, the base station 100 (the power decision unit 151) decides on a level of power to be allocated to a data signal for each of a plurality of terminal devices serving as a target for multiplexing using SPC, and a level of power allocated to a reference signal unique to each of the plurality of terminal devices. In particular, for each of the plurality of terminal devices, the difference or ratio between power allocated to the data signal for the terminal device and power allocated to the reference signal unique to the terminal device is the same difference or ratio.

(a-1) Reference Signal

The reference signal is, for example, a reference signal transmitted using the same antenna port as the data signal.

The reference signal is, for example, a UERS.

Note that a reference signal unique to each of the plurality of terminal devices are, in other words, a user-specific reference signal for each of the plurality of terminal devices.

(a-2) Difference/Ratio

Referring to FIG. 6 again, power allocated to CRSs, a UERS for the user U (the terminal device 200), a data signal for the user U (the terminal device 200), a UERS for the user V (another terminal device), and a data signal for the user U (the other terminal device) is shown. The difference between power $P_{DATA,U}$ allocated to the data signal for the user U (the terminal device 200) and power $P_{UERS,U}$ allocated to the UERS for the user U (the terminal device 200) is, for example, D (dBm). Furthermore, the difference between power $P_{DATA,V}$ allocated to the data signal for the user V (the other terminal device) and power $P_{UERS,V}$ allocated to the UERS for the user V (the other terminal device) is also D (dBm).

Accordingly, when multiplexing is performed using SPC, for example, the terminal device 200 can ascertain reception power of each of the plurality of data signals included in a multiplexed signal from reception power of each of the plurality of reference signals. Thus, the terminal device 200 can appropriately decode the data signals. Furthermore, since reporting of information on power allocation to the data signals is unnecessary, for example, overhead can be reduced.

(b) Decoding

As a second example, the terminal device 200 (the reception processing unit 245) decodes a data signal for a target terminal device (the terminal device 200) among data signals for a plurality of terminal devices serving as a target for multiplexing using SPC on the basis of reception power of a reference signal unique to each of the plurality of terminal devices. With regard to each of the plurality of terminal devices, the difference or ratio between power allocated to a data signal for a terminal device and power allocated to a reference signal unique to a terminal device is the same difference or ratio.

Description of the reference signals and the predetermined difference and the predetermined ratio is as described above. Thus, overlapping description will be omitted here.

The ratio between the sum of reception power of the reference signals and reception power of a reference signal unique to the terminal device 200 is, for example, equal to the ratio between reception power of a multiplexed signal and reception power of a data signal for the terminal device 200. Thus, the terminal device 200 (the reception processing unit 245) computes reception power of the data signal for the terminal device 200 from reception power of a reference signal unique to each of the plurality of terminal devices and the reception power of the multiplexed signal including the data signal for the terminal device 200. Then, the terminal device 200 (the reception processing unit 245) decodes the data signal for the terminal device 200 on the basis of the reception power of the data signal for the terminal device 200.

5.2. Process Flow

Figure 28:
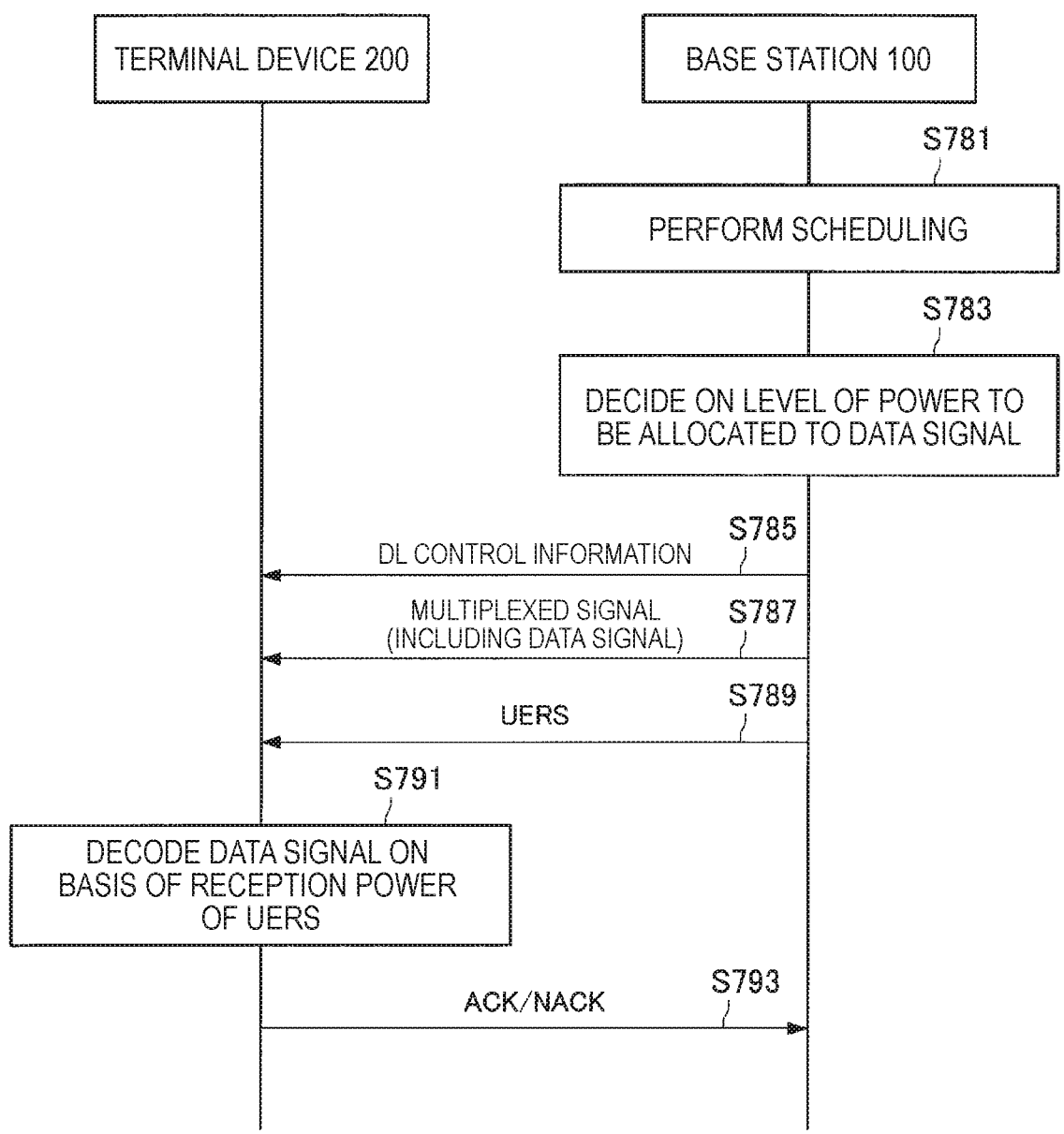
FIG. 28 is a sequence diagram showing an example of a schematic flow of an overall process according to the second embodiment.

Next, an example of a flow of a process according to the second embodiment will be described with reference to FIG. 28. FIG. 28 is a sequence diagram showing an example of a schematic flow of an overall process according to the second embodiment.

The base station 100 performs scheduling (S781). That is, the base station 100 allocates radio resources to terminal devices. For example, the base station 100 allocates radio resources to each of a plurality of terminal devices including the terminal device 200. The base station 100 allocates the radio resources for, for example, transmission of data signals to each of the plurality of terminal devices.

Furthermore, the base station 100 (the power decision unit 151) decides on a level of power to be allocated to the data signal for each of the plurality of terminal devices (S783).

Thereafter, the base station 10 (the transmission processing unit 157) 0, the base station 100 transmits downlink control information to each of the plurality of terminal devices (S785). Further, the base station 100 (the transmission processing unit 157) multiplexes the data signals for the plurality of terminal devices using SPC, and transmits a multiplexed signal (S787). Further, the base station 100 (the transmission processing unit 157) also transmits UERSs to each of the plurality of terminal devices (S789).

The terminal device 200 (the reception processing unit 245) decodes a data signal for the terminal device 200 on the basis of reception power of the UERS for the terminal device 200 (S791). As a first example, the terminal device 200 (the reception processing unit 245) decodes the data signal for the terminal device 200 on the basis of the reception power of the UERS for the terminal device 200. As a second example, the terminal device 200 (the reception processing unit 245) decodes the data signal for the terminal device 200 on the basis of reception power of the UERS for each of the plurality of terminal devices.

Then, the terminal device 200 transmits an acknowledgement (ACK) or a negative acknowledgement (NACK) to the base station 100 (S793).

6. APPLICATION EXAMPLE

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semipermanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

6.1. Application Example with Regard to Base Station

First Application Example

Figure 29:
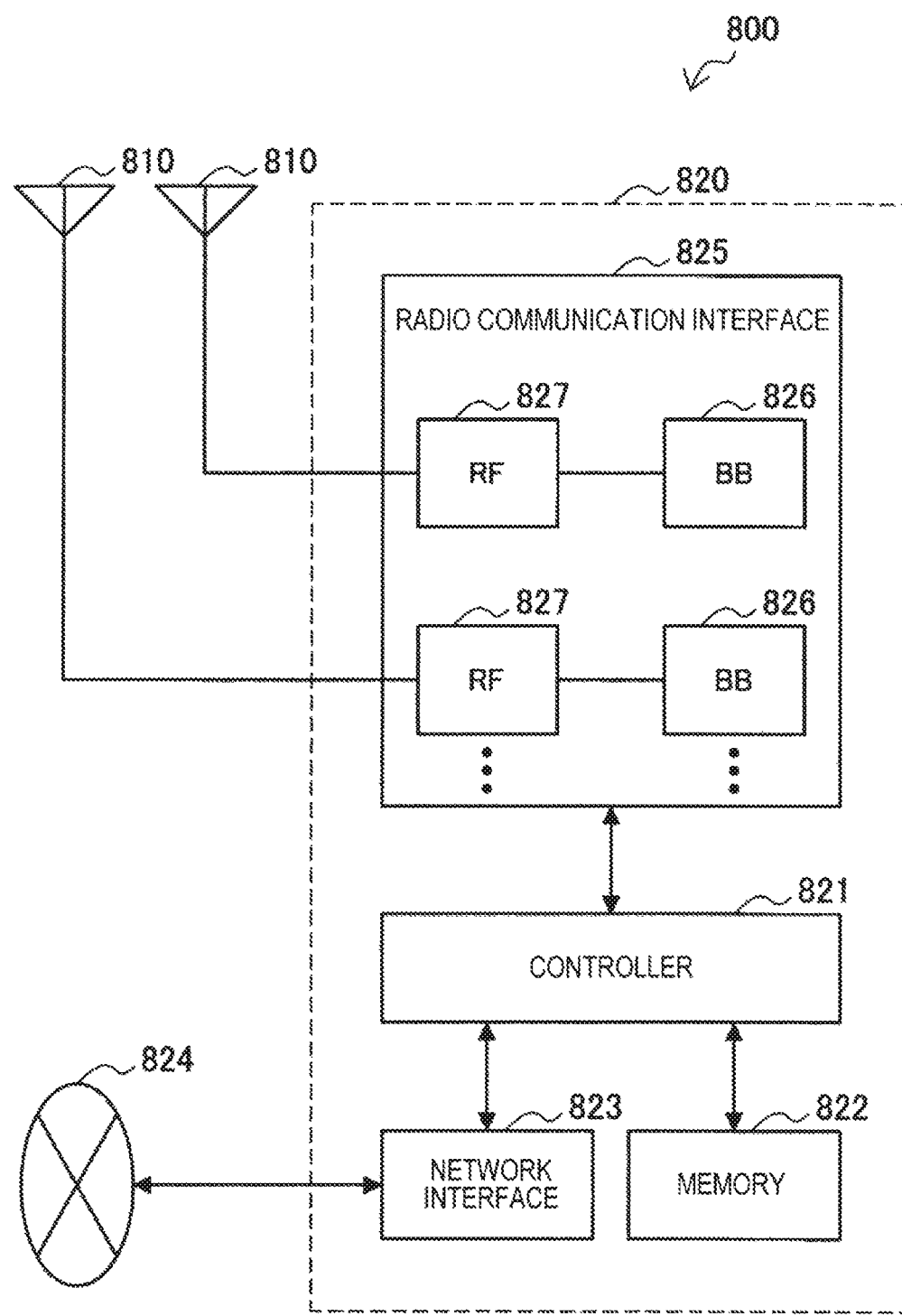
FIG. 29 is a block diagram illustrating a first example of a schematic configuration of an eNB.

FIG. 29 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 29. For example, the multiple antennas 810 may be compatible with multiple frequency bands used by the eNB 800. Although FIG. 29 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 29. For example, the multiple BB processors 826 may be compatible with multiple frequency bands used by the eNB 800. The radio communication interface 825 may include the multiple RF circuits 827, as illustrated in FIG. 29. For example, the multiple RF circuits 827 may be compatible with multiple antenna elements. Although FIG. 29 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 29, one or more structural elements included in the processing unit 150 (the power decision unit 151, the information acquisition unit 153, the reporting unit 155, the transmission processing unit 157 and/or the reception processing unit 159) described with reference to FIG. 9 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the radio communication interface 825 (for example, the BB processor 826) and/or the controller 821 may execute the program. As described above, the eNB 800, the base station device 820, or the module may be provided as a device which includes the one or more structural elements, and the program for causing the processor to function as the one or more structural elements may be provided. In addition, a readable recording medium in which the program is recorded may be provided.

In addition, in the eNB 800 shown in FIG. 29, the radio communication unit 120 described with reference to FIG. 9 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823.

Second Application Example

Figure 30:
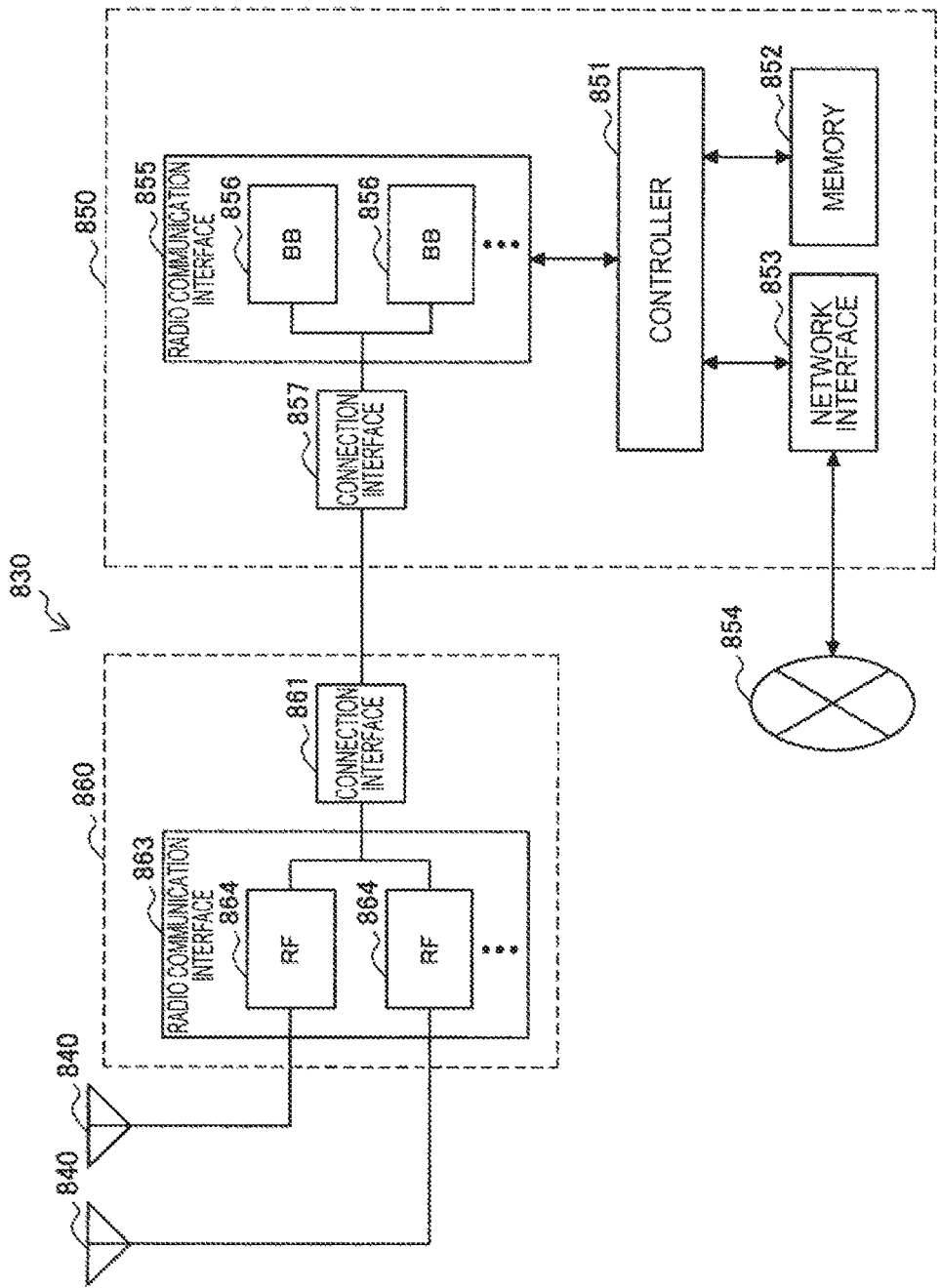
FIG. 30 is a block diagram illustrating a second example of the schematic configuration of the eNB.

FIG. 30 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 30. For example, the multiple antennas 840 may be compatible with multiple frequency bands used by the eNB 830. Although FIG. 30 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 29.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 29, except the BB processor 856 is connected to the RF circuit 864 of the RRH 860 via the connection interface 857. The radio communication interface 855 may include the multiple BB processors 856, as illustrated in FIG. 30. For example, the multiple BB processors 856 may be compatible with multiple frequency bands used by the eNB 830. Although FIG. 30 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 30. For example, the multiple RF circuits 864 may support multiple antenna elements. Although FIG. 30 illustrates the example in which the radio communication interface 863 includes the multiple RF circuits 864, the radio communication interface 863 may also include a single RF circuit 864.

In the eNB 830 shown in FIG. 30, one or more structural elements included in the processing unit 150 (the power decision unit 151, the information acquisition unit 153, the reporting unit 155, the transmission processing unit 157 and/or the reception processing unit 159) described with reference to FIG. 9 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the radio communication interface 855 (for example, the BB processor 856) and/or the controller 851 may execute the program. As described above, the eNB 830, the base station device 850, or the module may be provided as a device which includes the one or more structural elements, and the program for causing the processor to function as the one or more structural elements may be provided. In addition, a readable recording medium in which the program is recorded may be provided.

Figure 9:
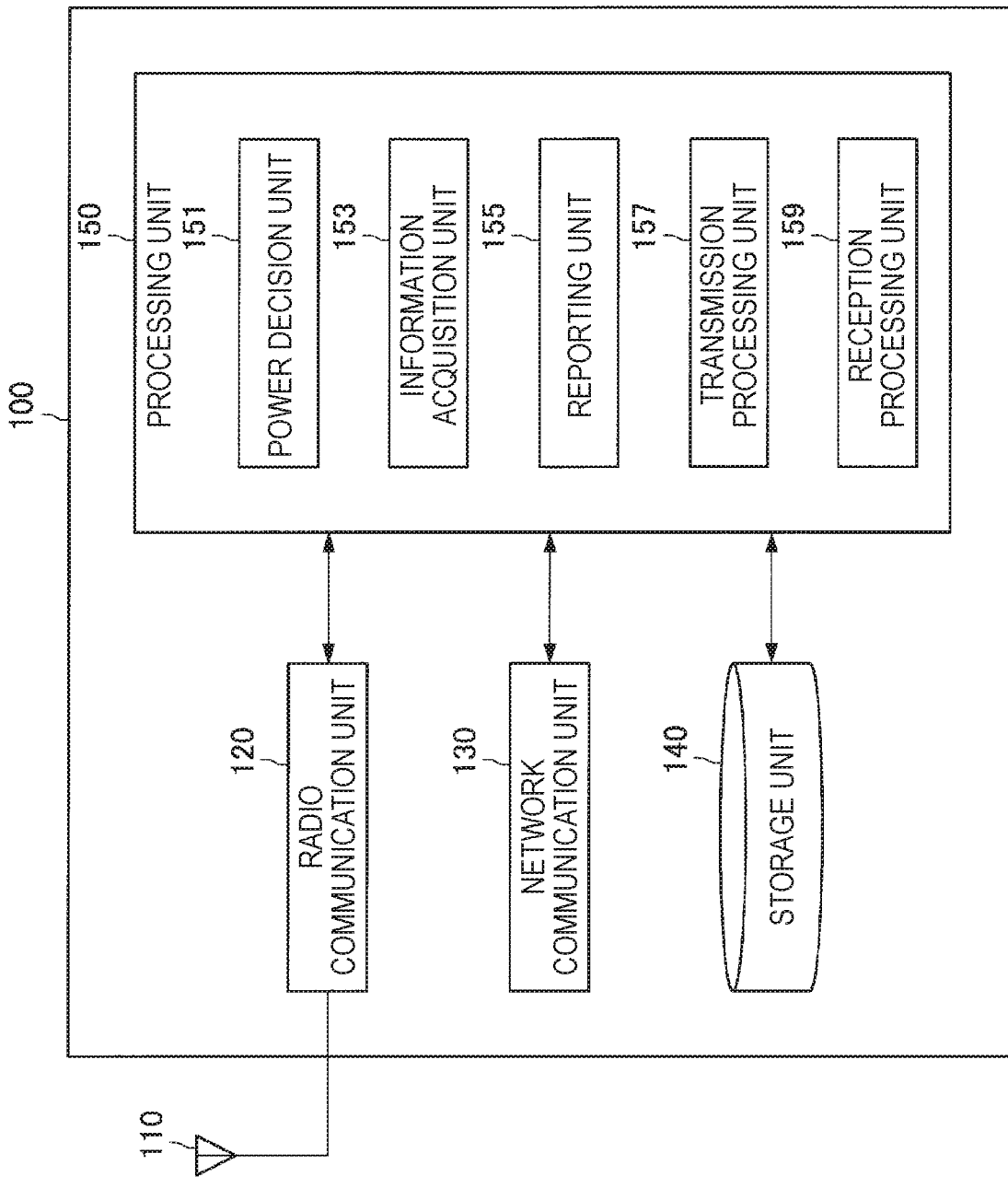
FIG. 9 is a block diagram illustrating an example of a configuration of a base station according to the embodiment.

In addition, in the eNB 830 shown in FIG. 30, the radio communication unit 120 described, for example, with reference to FIG. 9 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853.

6.2. Application Example with Regard to Terminal Device

First Application Example

Figure 31:
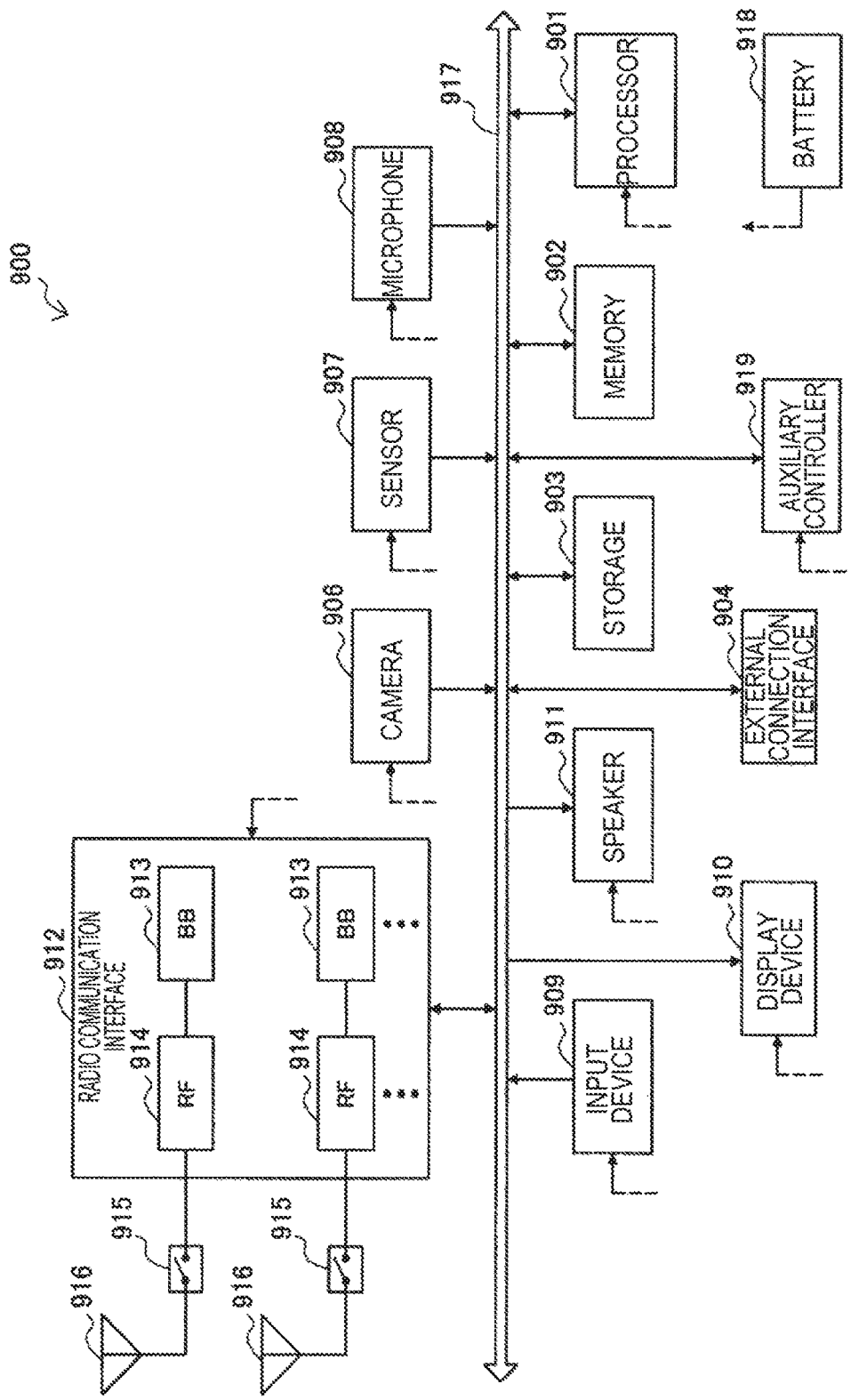
FIG. 31 is a block diagram illustrating an example of a schematic configuration of a smartphone.

FIG. 31 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 31. Although FIG. 31 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 31. Although FIG. 31 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 31 via feeder lines, which are partially shown as dashed lines in the figure. The auxiliary controller 919 operates a minimum necessary function of the smartphone 900, for example, in a sleep mode.

In the smartphone 900 shown in FIG. 31, one or more structural elements included in the processing unit 240 (the information acquisition unit 241, the transmission processing unit 243 and/or the reception processing unit 245) described with reference to FIG. 10 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the radio communication interface 912 (for example, the BB processor 913), the processor 901 and/or the auxiliary controller 919 may execute the program. As described above, the smartphone 900 or the module may be provided as a device which includes the one or more structural elements, and the program for causing the processor to function as the one or more structural elements may be provided. In addition, a readable recording medium in which the program is recorded may be provided.

Figure 10:
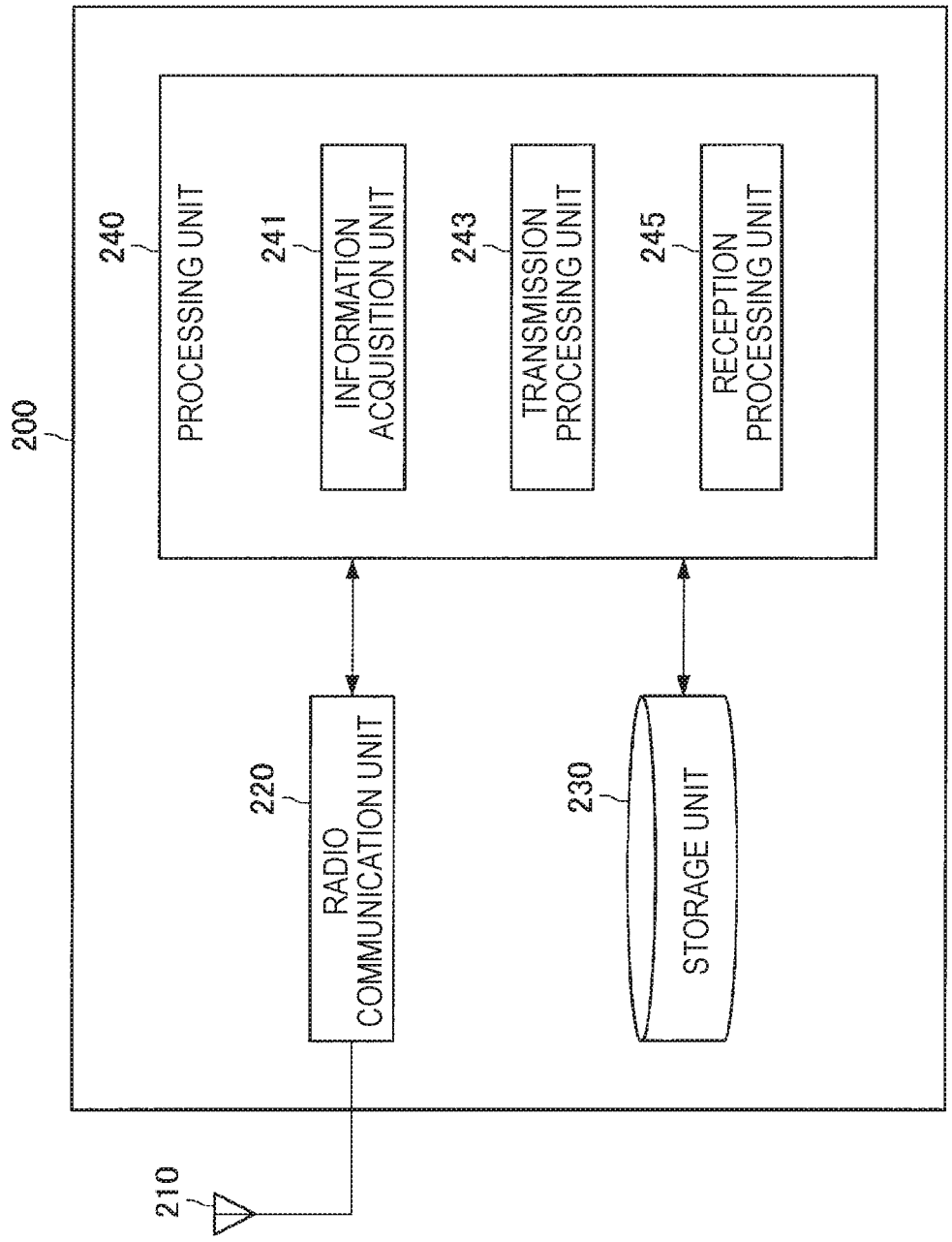
FIG. 10 is a block diagram illustrating an example of a configuration of a terminal device according to the embodiment.

In addition, in the smartphone 900 shown in FIG. 31, the radio communication unit 220 described, for example, with reference to FIG. 10 may be implemented by the radio communication interface 912 (for example, the RF circuit 914). Moreover, the antenna unit 210 may be implemented by the antenna 916.

Second Application Example

Figure 32:
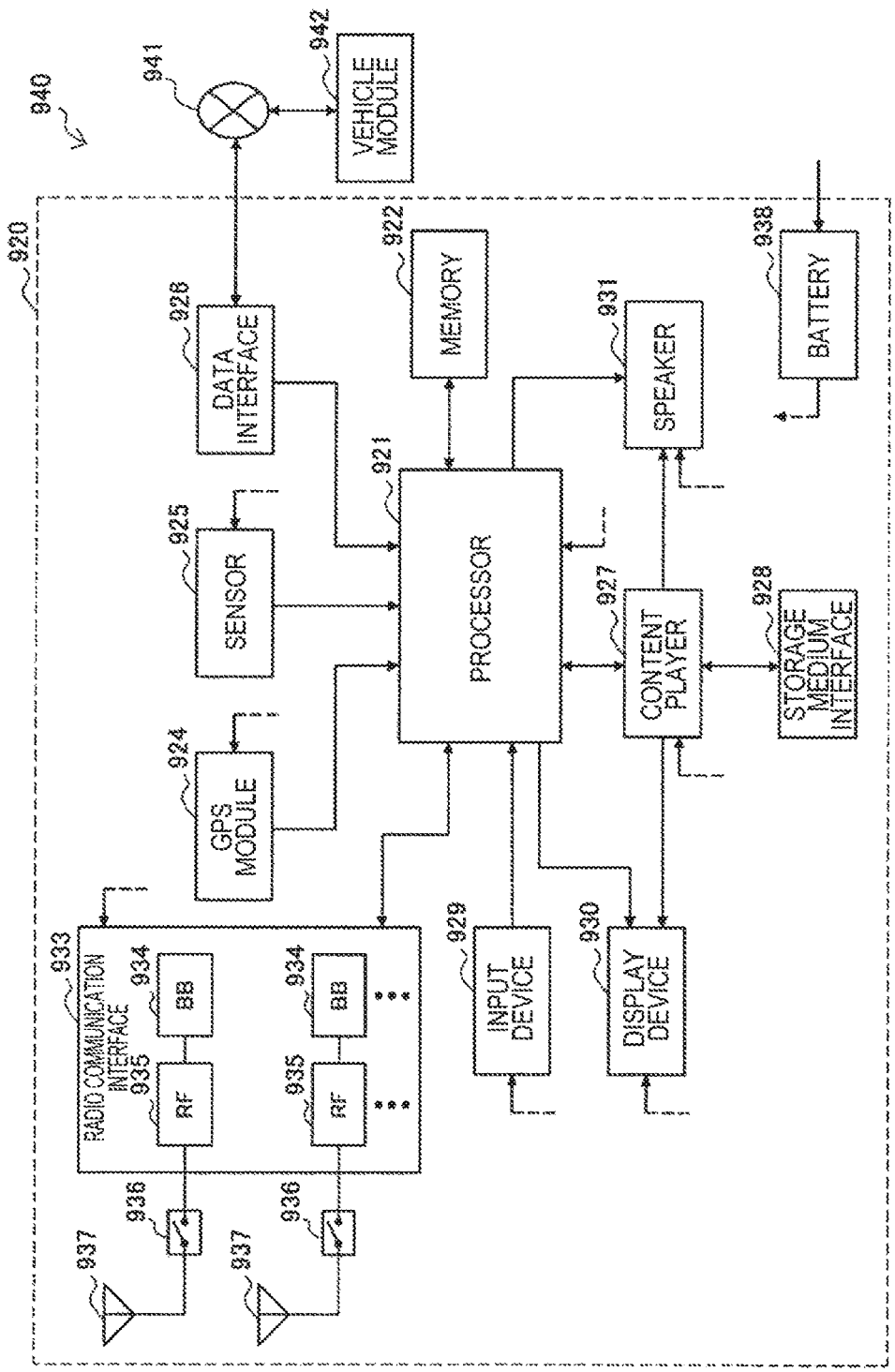
FIG. 32 is a block diagram illustrating an example of a schematic configuration of a car navigation device.

FIG. 32 is a block diagram illustrating an example of a schematic configuration of a car navigation device 920 to which the technology of the present disclosure may be applied. The car navigation device 920 includes a processor 921, a memory 922, a global positioning system (GPS)

module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 32. Although FIG. 32 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 32. Although FIG. 32 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 32 via feeder lines that are partially shown as dashed lines in the figure. The battery 938 accumulates power supplied form the vehicle.

In the car navigation device 920 shown in FIG. 32, one or more structural elements included in the processing unit 240 (the information acquisition unit 241, the transmission processing unit 243 and/or the reception processing unit 245) described with reference to FIG. 10 may be implemented by the radio communication interface 933. Alternatively, at least some of these constituent elements may be implemented by the processor 921. As an example, a module which includes a part (for example, the BB processor 934) or all of the radio communication interface 933 and/or the processor 921 may be mounted in the car navigation device 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation device 920, and the radio communication interface 933 (for example, the BB processor 934) and/or the processor 921 may execute the program. As described above, the car navigation device 920 or the module may be provided as a device which includes the one or more structural elements, and the program for causing the processor to function as the one or more structural elements may be provided. In addition, a readable recording medium in which the program is recorded may be provided.

In addition, in the car navigation device 920 shown in FIG. 32, the radio communication unit 220 described, for example, with reference to FIG. 10 may be implemented by the radio communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the one or more structural elements (the information acquisition unit 241, the transmission processing unit 243 and/or the reception processing unit 245). The vehicle module 942 generates vehicle data such as vehicle speed, engine speed, and trouble information, and outputs the generated data to the in-vehicle network 941.

7. CONCLUSION

So far, devices and processes according to embodiments of the present disclosure have been described with reference to FIGS. 5 to 32.

(1) First Embodiment

In the first embodiment, the base station 100 includes the information acquisition unit 153 which acquires information on power allocation to a data signal serving as a target for multiplexing using SPC and the reporting unit 155 which reports the information on the power allocation (i.e., first allocation related information) to the terminal device 200.

In the first embodiment, the terminal device 200 includes, for example, the information acquisition unit 241 which acquires information on power allocation to a data signal serving as a target for multiplexing using SPC (i.e., first allocation related information) and the reception processing unit 245 which decodes the data signal on the basis of the information on the power allocation.

Accordingly, the terminal device can appropriately decode the data signal when, for example, multiplexing is performed using SPC.

(2) Second Embodiment (a) First Example

As a first example in the second embodiment, the base station 100 includes the power decision unit 151 which decides on a level of power to be allocated to a data signal for the terminal device 200 serving as a target for multiplexing using SPC and a reference signal unique to the terminal device 200. The difference or ratio between the power allocated to the data signal and the power allocated to the reference signal is a predetermined difference or ratio.

As the first example in the second embodiment, the terminal device 200 includes the reception processing unit 245 which decodes the data signal for the terminal device 200 serving as a target for multiplexing using SPC on the basis of reception power of the reference signal unique to the terminal device 200. The difference or ratio between the power allocated to the data signal and the power allocated to the reference signal is a predetermined difference or ratio.

Accordingly, the terminal device can appropriately decode the data signal when, for example, multiplexing is performed using SPC. Furthermore, since reporting of information on power allocation to the data signal is unnecessary, for example, overhead can be reduced.

(b) Second Example

As a second example in the second embodiment, the base station 100 includes the power decision unit 151 which decides on a level of power to be allocated to a data signal for each of a plurality of terminal devices and power to be allocated to a reference signal unique to each of the plurality of terminal devices, the signals serving as a target for multiplexing using SPC. With regard to each of the plurality of terminal devices, the difference or ratio between power allocated to a data signal for a terminal device and power allocated to a reference signal unique to each of the terminal devices is the same difference or ratio.

As the second example in the second embodiment, the terminal device 200 includes the reception processing unit 245 which decodes a data signal for a target terminal device (i.e., the terminal device 200) among data signals for a plurality of terminal devices, the signals serving as a target for multiplexing using SPC, on the basis of reception power of a reference signal unique to each of the plurality of terminal devices. With regard to each of the plurality of terminal devices, the difference or ratio between power allocated to a data signal for a terminal device and power allocated to a reference signal unique to a terminal device is the same difference or ratio.

Accordingly, the terminal device can appropriately decode the data signal when, for example, multiplexing is performed using SPC. Furthermore, since reporting of information on power allocation to the data signal is unnecessary, for example, overhead can be reduced.

So far, exemplary embodiments of the present disclosure have been described with reference to accompanying diagrams, but it is a matter of course that the present disclosure is not limited thereto. It is obvious that a person skilled in the art can conceive various modified examples or altered examples within the scope described in the claims, and it is understood that such examples also belong to the technical scope of the present disclosure.

Although an example in which multiplexing is performed using SPC has been described in the above embodiments as an example of multiplexing using power allocation (i.e., multiplexing of signals to which different levels of power are allocated is performed on radio resources (frequency and time radio resources) at least some of which are overlapping), the present disclosure is not limited thereto. Instead of multiplexing using SPC, another type of multiplexing using power allocation (or multiplexing with another name) may be performed.

In addition, processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the power decision unit, the information acquisition unit, the reporting unit, the transmission processing unit, the reception processing unit, and/or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the power decision unit, the information acquisition unit, the reporting unit, the transmission processing unit, the reception processing unit, and/or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A device including:

an acquisition unit configured to acquire information on power allocation to a data signal serving as a target for multiplexing using power allocation; and a reporting unit configured to report the information on the power allocation to a terminal device.

(2)

The device according to (1), wherein the data signal is a signal for the terminal device.

(3)

The device according to (1) or (2), wherein the information on the power allocation is information indicating power allocated to the data signal.

(4)

The device according to (1) or (2), wherein the information on the power allocation is information indicating a difference or ratio between power allocated to the data signal and power allocated to another signal.

(5)

The device according to (4), wherein the other signal is a signal transmitted using a same antenna port as the data signal.

(6)

The device according to (4) or (5), wherein the other signal is a reference signal.

(7)

The device according to (6), wherein the reference signal is a cell-specific reference signal or a user-specific reference signal.

(8)

The device according to (4) or (5), wherein the other signal is another data signal.

(9)

The device according to (4) or (5), wherein the other signal is a multiplexed signal including the data signal.

(10)

The device according to any one of (1) to (9), wherein the acquisition unit acquires another piece of information on power allocation to a user-specific reference signal, the reporting unit reports the other piece of information on the power allocation to the terminal device.

(11)

The device according to (10), wherein the user-specific reference signal is a reference signal unique to the terminal device.

(12)

The device according to any one of (1) to (10), wherein the reporting unit reports, to the terminal device, the information on the power allocation, included in downlink control information, for the terminal device.

(13)

The device according to (12), wherein the downlink control information has a format to be applied to multiplexing using power allocation.

(14)

The device according to any one of (1) to (13), wherein the reporting unit reports, to the terminal device, information indicating a power ranking of the data signal among a plurality of data signals serving as a target for multiplexing using power allocation.

(15)

The device according to (14), wherein the reporting unit reports, to the terminal device, the information indicating the power ranking, included in downlink control information, for the terminal device.

(16)

The device according to any one of (1) to (15), wherein the information on the power allocation is information in a form according to an antenna port to be used in transmission of the data signal.

(17)

A device including:

an acquisition unit configured to acquire information on power allocation to a data signal serving as a target for multiplexing using power allocation; and a reception processing unit configured to decode the data signal on the basis of the information on the power allocation.

(18)

The device according to (17), wherein the reception processing unit computes reception power of the data signal on the basis of the information on the power allocation, and decodes the data signal on the basis of the reception power.

(19)

The device according to (17) or (18), wherein the information on the power allocation is information indicating power allocated to the data signal.

(20)

The device according to (18), wherein the information on the power allocation is information indicating a difference or ratio between power of the data signal and power of another signal, and the reception processing unit computes the reception power of the data signal on the basis of the information on the power allocation and reception power of the other signal.

(21)

The device according to any one of (18) to (20), wherein the reception processing unit sequentially removes one or more other data signals whose reception power is greater than the data signal among a plurality of data signals included in a multiplexed signal including the data signal from the multiplexed signal as interference, and decodes the data signal.

(22)

The device according to (21), wherein the one or more other data signals are signals whose reception power is greater than the data signal by a predetermined amount of power.

(23)

The device according to (21) or (22), wherein the acquisition unit acquires information indicating a power ranking of the data signal among a plurality of data signals serving as a target for multiplexing using power allocation, and the reception processing unit sequentially removes the one or more other signals from the multiplexed signal as interference on the basis of the information indicating the power ranking.

(24)

The device according to any one of (1) to (23), wherein the multiplexing using power allocation is multiplexing using superposition coding (SPC).

(25)

A method including, by a processor:

acquiring information on power allocation to a data signal serving as a target for multiplexing using power allocation; and reporting the information on the power allocation to a terminal device.

(26)

A program causing a processor to execute:

acquiring information on power allocation to a data signal serving as a target for multiplexing using power allocation; and reporting the information on the power allocation to a terminal device.

(27)

A readable recording medium having a program recorded thereon, the program causing a processor to execute:

acquiring information on power allocation to a data signal serving as a target for multiplexing using power allocation; and reporting the information on the power allocation to a terminal device.

(28)

A method including, by a processor:

acquiring information on power allocation to a data signal serving as a target for multiplexing using power allocation; and decoding the data signal on the basis of the information on the power allocation.

(29)

A program causing a processor to execute:

acquiring information on power allocation to a data signal serving as a target for multiplexing using power allocation; and decoding the data signal on the basis of the information on the power allocation.

(30)

A readable recording medium having a program recorded thereon, the program causing a processor to execute:

acquiring information on power allocation to a data signal serving as a target for multiplexing using power allocation; and decoding the data signal on the basis of the information on the power allocation.

(31)

A device which includes:

a power decision unit configured to decide on a level of power to be allocated to a data signal for a terminal device serving as a target for multiplexing using power allocation and a reference signal unique to the terminal device, in which the difference or ratio between power allocated to the data signal and power allocated to the reference signal is a predetermined difference or ratio.

(32)

The device described in (31) in which the power allocated to the data signal is equal to the power allocated to the reference signal.

(33)

A device which includes:

a reception processing unit configured to decode a data signal for a terminal device serving as a target for multiplexing using power allocation on the basis of reception power of a reference signal unique to the terminal device, in which the difference or ratio between power allocated to the data signal and power allocated to the reference signal is a predetermined difference or ratio.

(34)

A device which includes:

a power decision unit configured to decide on a level of power to be allocated to a data signal for each of a plurality of terminal devices serving as a target for multiplexing using power allocation and power to be allocated to a reference signal unique to each of the plurality of terminal devices, in which, with regard to each of the plurality of terminal devices, the difference or ratio between power allocated to a data signal for a terminal device and power allocated to a reference signal unique to the terminal device is the same difference or ratio.

(35)

A device which includes:

a reception processing unit configured to decode a data signal for a target terminal device among data signals for a plurality of terminal devices serving as a target for multiplexing using data allocation on the basis of reception power of a reference signal unique to each of the plurality of terminal devices, in which, with regard to each of the plurality of terminal devices, the difference or ratio between power allocated to a data signal for a terminal device and power allocated to a reference signal unique to the terminal device is the same difference or ratio.

(36)

A method which includes, by a processor:

deciding on a level of power to be allocated to a data signal for a terminal device serving as a target for multiplexing using power allocation and a reference signal unique to the terminal device, in which the difference or ratio between power allocated to the data signal and power allocated to the reference signal is a predetermined difference or ratio.

(37)

A program causing a processor to execute:

deciding on a level of power to be allocated to a data signal for a terminal device serving as a target for multiplexing using power allocation and a reference signal unique to the terminal device, in which the difference or ratio between power allocated to the data signal and power allocated to the reference signal is a predetermined difference or ratio.

(38)

A readable recording medium having a program recorded thereon, the program causing a processor to execute:

deciding on a level of power to be allocated to a data signal for a terminal device serving as a target for multiplexing using power allocation and a reference signal unique to the terminal device, in which the difference or ratio between power allocated to the data signal and power allocated to the reference signal is a predetermined difference or ratio.

(39)

A method which includes, by a processor:

decoding a data signal for a terminal device serving as a target for multiplexing using power allocation on the basis of reception power of a reference signal unique to the terminal device, in which the difference or ratio between power allocated to the data signal and power allocated to the reference signal is a predetermined difference or ratio.

(40)

A program causing a processor to execute:

decoding a data signal for a terminal device serving as a target for multiplexing using power allocation on the basis of reception power of a reference signal unique to the terminal device, in which the difference or ratio between power allocated to the data signal and power allocated to the reference signal is a predetermined difference or ratio.

(41)

A readable recording medium having a program recorded thereon, the program causing a processor to execute:

decoding a data signal for a terminal device serving as a target for multiplexing using power allocation on the basis of reception power of a reference signal unique to the terminal device, in which the difference or ratio between power allocated to the data signal and power allocated to the reference signal is a predetermined difference or ratio.

(42)

A method which includes, by a processor:

deciding on a level of power to be allocated to a data signal for each of a plurality of terminal devices serving as a target for multiplexing using power allocation and power to be allocated to a reference signal unique to each of the plurality of terminal devices, in which, with regard to each of the plurality of terminal devices, the difference or ratio between power allocated to a data signal for a terminal device and power allocated to a reference signal unique to the terminal device is the same difference or ratio.

(43)

A program causing a processor to execute:

deciding on a level of power to be allocated to a data signal for each of a plurality of terminal devices serving as a target for multiplexing using power allocation and power to be allocated to a reference signal unique to each of the plurality of terminal devices, in which, with regard to each of the plurality of terminal devices, the difference or ratio between power allocated to a data signal for a terminal device and power allocated to a reference signal unique to the terminal device is the same difference or ratio.

(44)

A readable recording medium having a program recorded thereon, the program causing a processor to execute:

deciding on a level of power to be allocated to a data signal for each of a plurality of terminal devices serving as a target for multiplexing using power allocation and power to be allocated to a reference signal unique to each of the plurality of terminal devices, in which, with regard to each of the plurality of terminal devices, the difference or ratio between power allocated to a data signal for a terminal device and power allocated to a reference signal unique to the terminal device is the same difference or ratio.

(45)

A method which includes, by a processor:

decoding a data signal for a target terminal device among data signals for a plurality of terminal devices serving as a target for multiplexing using data allocation on the basis of reception power of a reference signal unique to each of the plurality of terminal devices, in which, with regard to each of the plurality of terminal devices, the difference or ratio between power allocated to a data signal for a terminal device and power allocated to a reference signal unique to the terminal device is the same difference or ratio.

(46)

A program causing a processor to execute:

decoding a data signal for a target terminal device among data signals for a plurality of terminal devices serving as a target for multiplexing using data allocation on the basis of reception power of a reference signal unique to each of the plurality of terminal devices, in which, with regard to each of the plurality of terminal devices, the difference or ratio between power allocated to a data signal for a terminal device and power allocated to a reference signal unique to the terminal device is the same difference or ratio.

(47)

A readable recording medium having a processor recorded thereon, the program causing a processor to execute:

decoding a data signal for a target terminal device among data signals for a plurality of terminal devices serving as a target for multiplexing using data allocation on the basis of reception power of a reference signal unique to each of the plurality of terminal devices, in which, with regard to each of the plurality of terminal devices, the difference or ratio between power allocated to a data signal for a terminal device and power allocated to a reference signal unique to the terminal device is the same difference or ratio.

REFERENCE SIGNS LIST 1 system
100 base station
151 power decision unit
153 information acquisition unit
155 reporting unit
157 transmission processing unit
159 reception processing unit
200 terminal device
241 information acquisition unit
243 transmission processing unit
245 reception processing unit

The invention claimed is:

1. A device, comprising:
a first antenna port configured to transmit a first data signal of a plurality of data signals; and
at least one processor configured to:
determine first information on power allocation for the first data signal, wherein
the first information indicates a difference between a power allocated to the first data signal and a power allocated to a reference signal,
the reference signal is specific to a terminal device and is transmitted by the first antenna port,
and the first information on the power allocation is based on the first antenna port;
execute a multiplexing operation on the first data signal based on the power allocation for the first data signal, wherein:
the first data signal is a spatial stream signal, and
the power allocation for the first data signal is one of:
an adaptive power allocation based on a diagonal matrix, or
a scalar power allocation;
report the first information on the power allocation to the terminal device; and
report a power rank of the first data signal to the terminal device, wherein the power rank corresponds to a power level of the first data signal with respect to a plurality of power levels of the plurality of data signals other than the power level of the first data signal.

2. The device according to claim 1, wherein the first data signal is a signal for the terminal device.

3. The device according to claim 1, wherein the first information on the power allocation further indicates the power allocated to the first data signal.

4. The device according to claim 1, wherein the first information on the power allocation further indicates a ratio between the power allocated to the first data signal and the power allocated to the reference signal.

5. The device according to claim 4, wherein the reference signal is transmitted via a second antenna port that is same as the first antenna port.

6. The device according to claim 1, wherein the reference signal is one of a cell-specific reference signal or a user-specific reference signal.

7. The device according to claim 4, wherein the reference signal is a second data signal.

8. The device according to claim 4, wherein the reference signal is a multiplexed signal that includes the first data signal.

9. The device according to claim 1, wherein the at least one processor is further configured to:
acquire second information on power allocation for a user-specific reference signal; and
report the second information to the terminal device.

10. The device according to claim 9, wherein the user-specific reference signal is unique to the terminal device.

11. The device according to claim 1, wherein downlink control information for the terminal device includes the first information.

12. The device according to claim 11, wherein
the downlink control information has a downlink control information (DCI) format, and
the at least one processor is further configured to execute the multiplexing operation on the DCI format based on the power allocation for the first data signal.

13. The device according to claim 1, wherein the at least one processor is further configured to execute the multiplexing operation on the plurality of data signals based on the power allocation for the first data signal.

14. The device according to claim 13, wherein
the at least one processor is further configured to report, to the terminal device, second information that indicates the power rank, and
downlink control information for the terminal device includes the second information.

15. A device, comprising:
at least one processor configured to:
acquire information on power allocation to a first data signal of a plurality of data signals, wherein
the information indicates a difference between a power allocated to the first data signal and a power allocated to a reference signal,
the information is based on an antenna port utilized for transmission of the first data signal, and
the reference signal is specific to the device and is transmitted by the antenna port,
a multiplexing operation is executed on the first data signal based on the power allocation to the first data signal,
the first data signal is a spatial stream signal, and
the power allocation to the first data signal is one of:
an adaptive power allocation based on a diagonal matrix, or
a scalar power allocation;
acquire a power rank of the first data signal, wherein the power rank corresponds to a power level of the first data signal with respect to a plurality of power levels of the plurality of data signals other than the power level of the first data signal; and
decode the first data signal based on the power rank and the information on the power allocation to the first data signal.

16. The device according to claim 15, wherein the at least one processor is further configured to:
compute a reception power of the first data signal based on the information on the power allocation to the first data signal; and
decode the first data signal based on the reception power.

17. The device according to claim 15, wherein the information on the power allocation further indicates the power allocated to the first data signal.

18. The device according to claim 16, wherein
the information on the power allocation to the first data signal further indicates a ratio between the power of the first data signal and the power of the reference signal, and
the at least one processor is further configured to compute the reception power of the first data signal based on the information on the power allocation to the first data signal and a reception power of the reference signal.

19. The device according to claim 16, wherein the at least one processor is further configured to
sequentially remove at least a second data signal, which has a reception power greater than the reception power of the first data signal, from the plurality of data signals, wherein a multiplexed signal includes:
the second data signal as interference, and
the first data signal.

20. The device according to claim 19, wherein
the multiplexing operation is executed on the plurality of data signals based on the power allocation to the first data signal, and
the at least one processor is further configured to sequentially remove at least the second data signal from the multiplexed signal as the interference based on the power rank.

21. The device according to claim 1, wherein the multiplexing operation is based on superposition coding (SPC).

* * * * *